United States Patent
Wu et al.

(10) Patent No.: US 10,282,504 B2
(45) Date of Patent: May 7, 2019

(54) METHOD FOR IMPROVING CIRCUIT LAYOUT FOR MANUFACTURABILITY

(71) Applicant: Taiwan Semiconductor Manufacturing Co., Ltd., Hsin-Chu (TW)

(72) Inventors: Yun-Lin Wu, Hsin-Chu (TW); Cheng-Cheng Kuo, Hsinchu (TW); Chia-Ping Chiang, Taipei (TW); Chih-Wei Hsu, Zhubei (TW); Hua-Tai Lin, Hsinchu (TW); Kuei-Shun Chen, Hsinchu (TW); Yuan-Hsiang Lung, Hsinchu (TW); Yan-Tso Tsai, Hsin-Chu (TW)

(73) Assignee: TAIWAN SEMICONDUCTOR MANUFACTURING CO., LTD., Hsin-Chu (TW)

( * ) Notice: Subject to any disclaimer, the term of this patent is extended or adjusted under 35 U.S.C. 154(b) by 77 days.

(21) Appl. No.: 15/411,613

(22) Filed: Jan. 20, 2017

(65) Prior Publication Data
US 2018/0096090 A1 Apr. 5, 2018

Related U.S. Application Data

(60) Provisional application No. 62/402,790, filed on Sep. 30, 2016.

(51) Int. Cl.
*G06F 17/50* (2006.01)
*H01L 21/027* (2006.01)
(Continued)

(52) U.S. Cl.
CPC ...... *G06F 17/5072* (2013.01); *G06F 17/5081* (2013.01); *H01L 21/0274* (2013.01); *H01L 21/3086* (2013.01); *H01L 21/30604* (2013.01); *H01L 27/0207* (2013.01); *H01L 27/11807* (2013.01); *G06F 17/504* (2013.01); *G06F 2217/12* (2013.01); *H01L 21/823431* (2013.01);
(Continued)

(58) Field of Classification Search
USPC .......................................................... 716/54
See application file for complete search history.

(56) References Cited

U.S. PATENT DOCUMENTS 8,039,179 B2   10/2011   Shieh et al.
8,202,681 B2    6/2012   Lin et al.
(Continued)

*Primary Examiner* — Bryce M Aisaka
(74) *Attorney, Agent, or Firm* — Haynes and Boone, LLP

(57) ABSTRACT

A method of manufacturing an integrated circuit (IC) includes receiving a layout of the IC having a first region interposed between two second regions. The layout includes a first layer having first features and second and third layer having second and third features in the first region. The second and third features collectively form cut patterns for the first features. The method further includes modifying the second and third features by a mask house tool, resulting in modified second and third features, which collectively form modified cut patterns for the first features. The modifying of the second and third features meets at least one of following conditions: total spacing between adjacent modified second (third) features is greater than total spacing between adjacent second (third) features, and total length of the modified second (third) features is smaller than total length of the second (third) features.

20 Claims, 18 Drawing Sheets

(51) Int. Cl.
*H01L 21/306* (2006.01)
*H01L 21/308* (2006.01)
*H01L 27/02* (2006.01)
*H01L 27/118* (2006.01)
*H01L 21/8234* (2006.01)
*H01L 23/522* (2006.01)
*H01L 23/528* (2006.01)

(52) U.S. Cl.
CPC .... *H01L 21/823475* (2013.01); *H01L 23/528* (2013.01); *H01L 23/5226* (2013.01)

(56) References Cited

U.S. PATENT DOCUMENTS

| | | |
|---|---|---|
| 8,728,332 B2 | 5/2014 | Lin et al. |
| 8,822,243 B2 | 9/2014 | Yan et al. |
| 2006/0091468 A1 | 5/2006 | Liaw |
| 2011/0281208 A1 | 11/2011 | Lin et al. |
| 2012/0278776 A1 | 11/2012 | Lei et al. |
| 2013/0295769 A1 | 11/2013 | Lin et al. |
| 2013/0320451 A1 | 12/2013 | Liu et al. |
| 2014/0193974 A1 | 7/2014 | Lee et al. |
| 2014/0215421 A1 | 7/2014 | Chen et al. |
| 2014/0242794 A1 | 8/2014 | Lin et al. |
| 2014/0264760 A1 | 9/2014 | Chang et al. |
| 2014/0264899 A1 | 9/2014 | Chang et al. |
| 2014/0273442 A1 | 9/2014 | Liu et al. |
| 2014/0273446 A1 | 9/2014 | Huang et al. |
| 2015/0243667 A1* | 8/2015 | Liaw ................ H01L 27/1104 257/390 |

\* cited by examiner

METHOD FOR IMPROVING CIRCUIT LAYOUT FOR MANUFACTURABILITY

PRIORITY

This claims the benefit of U.S. Prov. App. Ser. No. 62/402,790, entitled "Method for Improving Circuit Layout for Manufacturability," filed Sep. 30, 2016, herein incorporated by reference in its entirety.

BACKGROUND

The semiconductor integrated circuit (IC) industry has experienced exponential growth. Technological advances in IC materials and design have produced generations of ICs where each generation has smaller and more complex circuits than the previous generation. This scaling down process generally provides benefits by increasing production efficiency and lowering associated costs, but it has also increased the complexity of processing and manufacturing ICs.

For example, a mandrel-cut double patterning technique is generally used when fabricating IC devices with high density, such as devices with fin-like field effect transistors (FinFETs). Mandrel-cut double patterning technique typically uses two patterns. The first one defines a mandrel pattern with relatively uniform pattern pitch and sizes, and the second one defines a cut pattern. The cut pattern removes unwanted portions of the mandrel pattern, a derivative, or both. Using such technique typically improves photolithographic process window. However, current mandrel-cut double patterning techniques are not totally satisfactory. For instance, some cut pattern designs have unnecessarily complicated pattern layout and/or narrow end-to-end spaces between patterns, making it difficult for mask and wafer fabrication.

Accordingly, improvements in cut pattern designs are desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
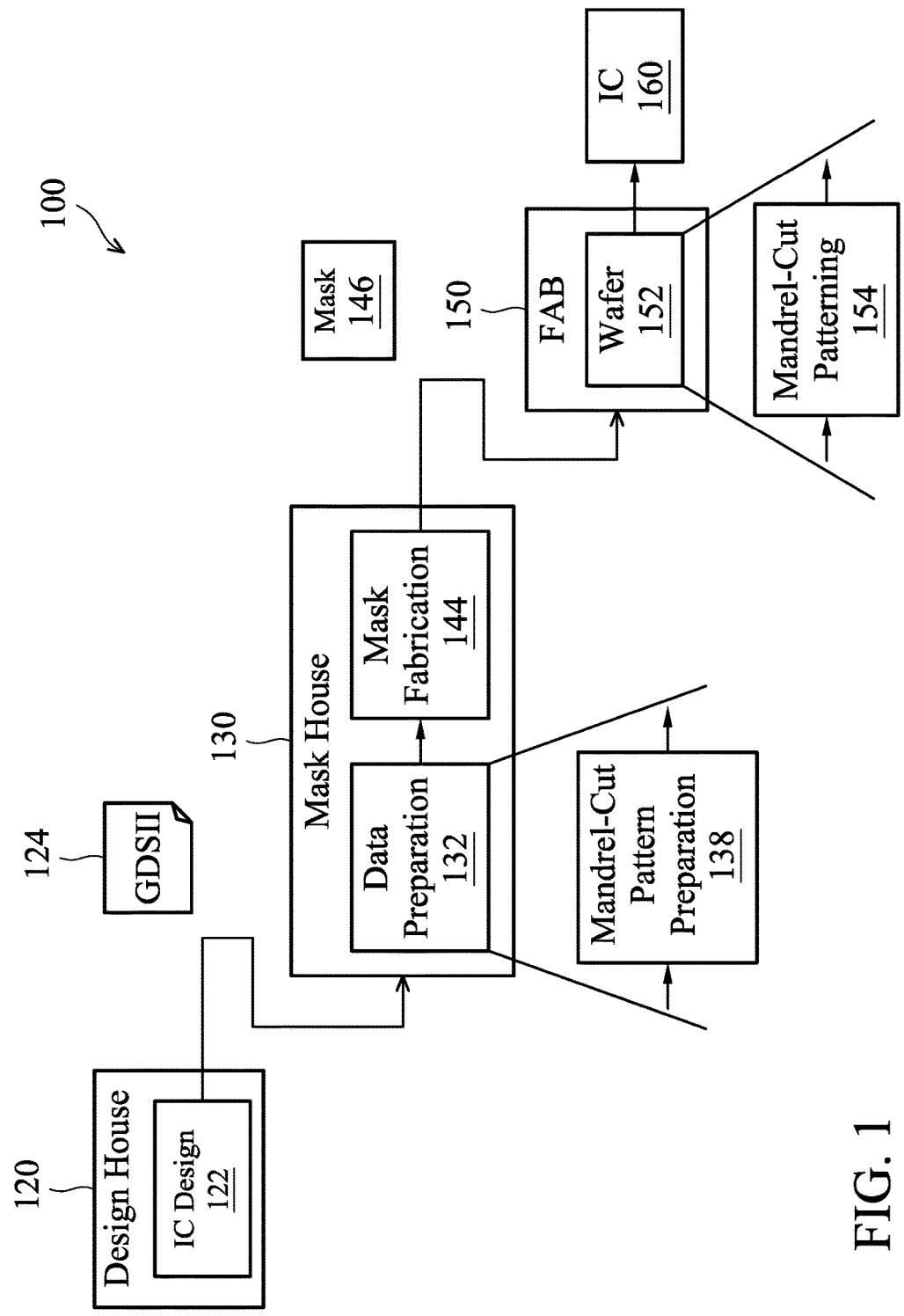
FIG. 1 is a simplified block diagram of an embodiment of an integrated circuit (IC) manufacturing system and an associated IC manufacturing flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to methods for manufacturing integrated circuits (IC), and more particularly related to applying mandrel-cut double patterning techniques for IC fabrication.

FIG. 1 is a simplified block diagram of an embodiment of an integrated circuit (IC) manufacturing system 100 and an IC manufacturing flow associated therewith, which may benefit from various aspects of the present disclosure. The IC manufacturing system 100 includes a plurality of entities, such as a design house 120, a mask house 130, and an IC manufacturer (or fab) 150, that interact with one another in the design, development, and manufacturing cycles and/or services related to manufacturing an integrated circuit (IC) device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 130, and fab 150 may be owned by a single company, and may even coexist in a common facility and use common resources. In a brief overview, the design house 120 produces an IC design layout 122 stored in data file 124, the mask house 130 produces one or more masks 146 using the data file 124, and the fab 150 manufactures one or more wafers 152 using the masks 146, thereby producing the IC devices 160. A more detailed description of each entity is presented below.

The design house (or design team) 120 generates an IC design layout 122, which includes various geometrical patterns designed for the IC device 160. The geometrical patterns correspond to patterns of metal, oxide, or semiconductor layers that make up the various components of the IC device 160. For example, a portion of the IC design layout 122 may include IC features such as active regions, gate electrodes, source and drain features, local (or level 0) interconnect lines, metal lines or vias of an interlayer interconnect, and openings for bonding pads to be formed in or on a semiconductor substrate (such as a silicon wafer). The design house 120 implements a proper design procedure to form the IC design layout 122. The design procedure may include logic design, physical design, and/or place and route. The IC design layout 122 is presented in one or more data files 124 having information of the geometrical patterns. For example, the data files 124 may be in GDSII file format, DFII file format, or other suitable file formats.

The mask house 130 uses the IC layout 122 to manufacture one or more masks 146 to be used for fabricating the various layers of the IC device 160. The mask house 130 performs mask data preparation 132, where the IC layout 122 is translated into a form that can be physically written by a mask writer, and mask fabrication 144, where the data prepared by the mask data preparation 132 is modified to comply with a particular mask writer and/or mask manufacturer and is then fabricated. In the present embodiment, mask data preparation 132 and mask fabrication 144 are illustrated as separate elements. However, mask data preparation 132 and mask fabrication 144 can be collectively referred to as mask data preparation.

In today's advanced manufacturing processes, the IC layout 122 generally needs to comply with a set of manufacturing rules in order to be fabricated properly downstream, including by the mask fabrication 144. Merely as an example for FinFET processes, fin active regions are designed to be rectangular features and are oriented lengthwise in one direction, and gate electrodes are designed to be rectangular features (top view) and are oriented lengthwise perpendicular to the fin active regions. Further, local interconnect lines are frequently used for interconnecting source and drain regions among transistors and are disposed at the same level of stack as the gate electrodes. In other words, both the local interconnect lines and the gate electrodes are disposed below inter-layer interconnects. For the purposes of enlarging process window, the local interconnect lines are fabricated with mandrel-cut patterning techniques in the present disclosure. The mandrel patterns may be designed as parallel rectangular pieces spaced with a certain pitch. The cut patterns may be designed as rectangular pieces oriented perpendicular to the mandrel patterns. Further, the cut pattern may be split into two or more subsets with each subset fabricated into a separate mask. In the present embodiment, the mask data preparation 132 includes a mandrel-cut pattern preparation module 138, which checks the mandrel and cut patterns in the IC layout 122 and modifies the cut patterns to improve the layout's manufacturability. The mask data preparation 132 may include additional modules, such as optical proximity correction (OPC), mask rule checker, lithography process checker, and other resolution enhancement techniques (RET), which are not shown in FIG. 1.

Figure 2B:
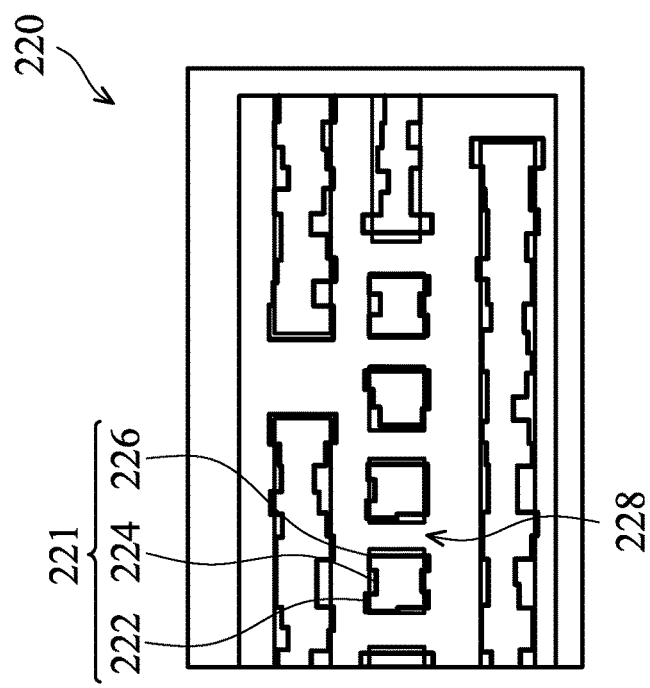
FIGS. 2A and 2B illustrate two different layout patterns and their corresponding mask patterns, according to embodiments of the present disclosure.
Figure 2A:
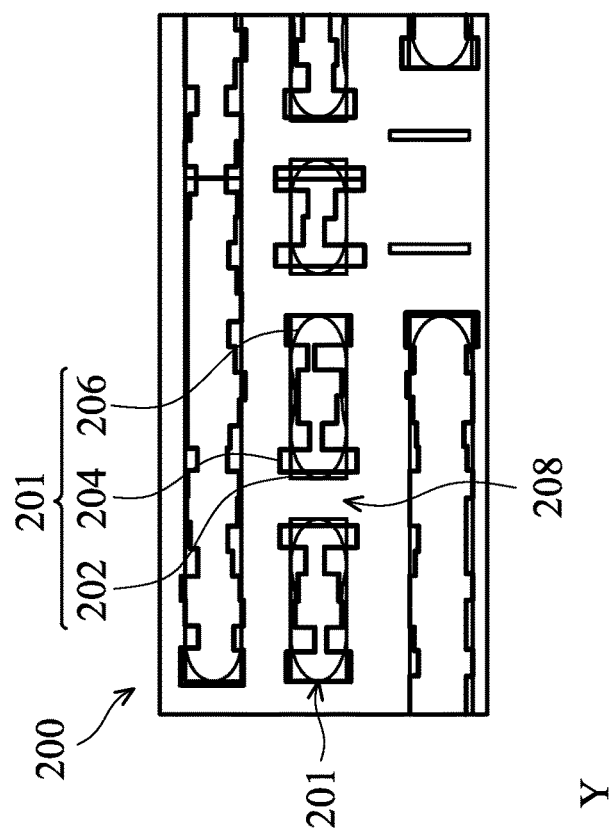

FIG. 2A illustrates an exemplary IC layout 200 with various rectangular layout patterns 201. The IC layout 200 is an embodiment of the IC design layout 122 (FIG. 1). FIG. 2A further illustrates different outlines of a pattern 201, including an original layout outline 202, an outline 204 as modified by OPC, and a simulated contour 206. The original layout outline 202 is produced by the design house 120. The outline 204 is produced by an OPC engine (not shown) in the mask data preparation 132 and closely represents the corresponding pattern on the mask 146. The simulated contour 206 is produced by a simulator (not shown) in the mask house 130 based on the outline 204 and the manufacturing processes implemented by the fab 150. The simulated contour 206 closely represents the final pattern formed on the wafer 152. As illustrated, the outline (and shape) of the pattern 201 changes considerably throughout the mask and wafer manufacturing processes. FIG. 2A further illustrates a gap (or spacing) 208 between adjacent ends of the patterns 201 along the X direction. The gap 208 may be narrowed during the above manufacturing processes due to the changes of shape in the patterns 201. This might lead to insufficient spacing between patterns, presenting challenges to both mask fabrication and wafer fabrication. For example, insufficient spacing between patterns may cause shorting of patterns. In an embodiment, the patterns 201 are cut patterns used for cutting mandrel patterns oriented perpendicular thereto. Shorting of the cut patterns 201 means some mandrel pattern(s) might be mistakenly cut (or kept).

One approach to this problem is to split the patterns 201 into two or more subsets. For example, one subset may include every other patterns 201 along the X direction and the other subset may include the remaining patterns 201. Each subset is fabricated into a separate mask 146. In embodiments, this approach enlarges the spacing between adjacent patterns 201 in any of the masks 146, thereby enlarging the manufacturing process window.

FIG. 2B illustrates another approach to the above problem. Referring to FIG. 2B, an IC layout 220 includes various patterns 221 that are designed as square or near-square shapes. The IC layout 220 is an embodiment of the IC design layout 122 (FIG. 1). Various outlines of a pattern 221 include an original outline 222 produced by the design house 120, an OPC-modified outline 224, and a simulated contour 226. As illustrated in FIG. 2B, the various outlines of the patterns 221 closely match one another. In other words, the shape of the patterns 221 remain substantially the same throughout the mask and wafer manufacturing processes. Consequently, gaps 228 between adjacent patterns 221 along the X direction remain substantially the same throughout the mask and wafer manufacturing processes. In embodiments, this approach of having small and/or square patterns advantageously reduces the number of masks 146 and reduces the number of photolithography processes performed by the fab 150, thereby reducing manufacturing costs.

In some embodiments, the module 138 uses one or both of the above approaches when creating or modifying cut patterns in order to improve manufacturability of the layout. FIGS. 3A-3E illustrate an IC layout 300 undergoing various stages of the layout modification by the module 138, constructed according to an embodiment of the present disclosure. FIGS. 4A-4D illustrate an IC layout 400 undergoing various stages of layout modification by the module 138, constructed according to another embodiment of the present disclosure. FIGS. 5A-5B illustrate an IC layout 500 before and after layout modification by the module 138, constructed according to an embodiment of the present disclosure. FIGS. 7A-7C illustrate an IC layout 700 before and after layout modification by the module 138, constructed according to another embodiment of the present disclosure. The IC layouts 300, 400, 500, and 700 are embodiments of the IC design layout 122 (FIG. 1). FIGS. 6A-6C and 8A-8D illustrate some scenarios that may be accepted or rejected by the module 138. Various aspects of the mandrel-cut pattern preparation module 138 are discussed below in conjunctions with FIGS. 3A-8D.

Figure 3A:
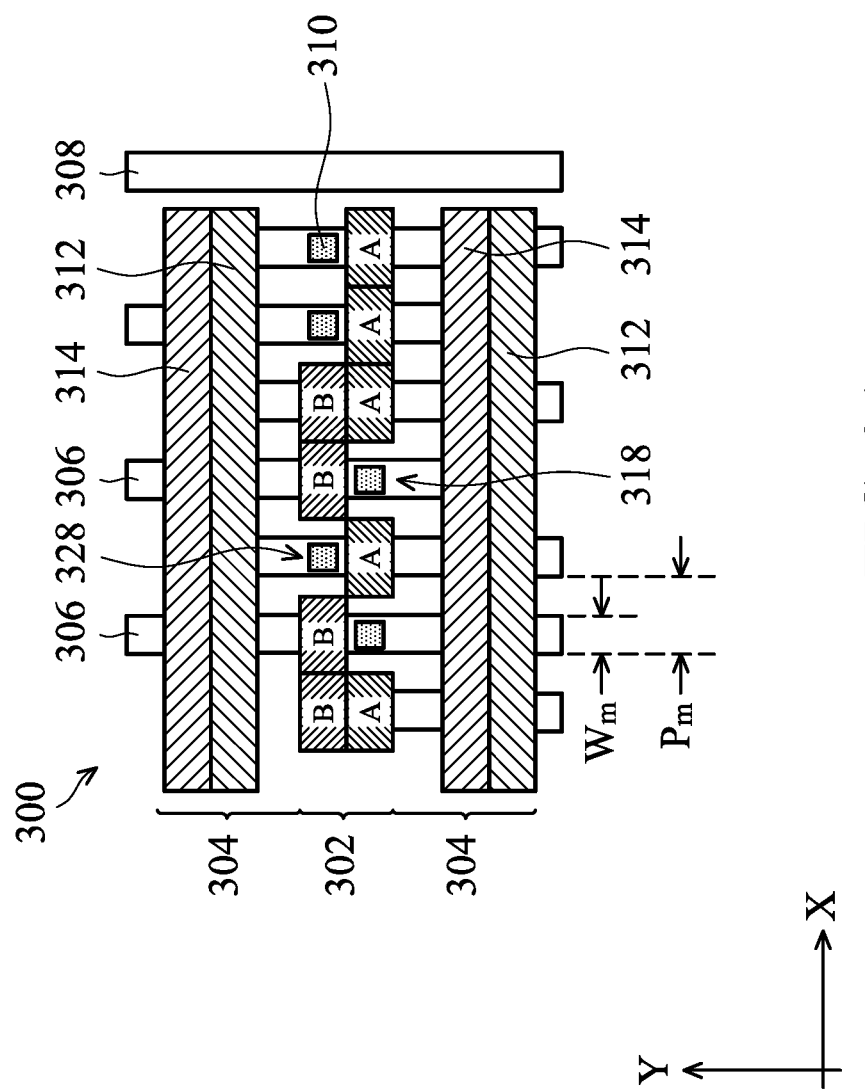
FIGS. 3A, 3B, 3C, 3D, and 3E illustrate an IC layout during various stages of a layout modification process, according to embodiments of the present disclosure.

Referring to FIG. 3A, the module 138 receives the IC layout 300. The IC layout 300 includes a first region 302 interposed between two second regions 304. In an embodiment, the first region 302 is for placing and routing power rails, such as positive power supply lines, negative power supply lines, and/or ground lines. To further this embodiment, the second regions 304 are for placing standard cells, such as AND, OR, XOR, NAND, and inverters. The first region 302 and the second regions 304 are oriented lengthwise along the X direction. The IC layout 300 may include other regions (not shown) such as I/O cell regions. Further, the regions 302 and 304 may be used for other types of circuit feature besides power rail routing and standard cell placement.

The layout 300 includes multiple layers for forming various circuit features. In the present embodiment, the layout 300 includes a first layer having features 306 oriented lengthwise along the Y direction perpendicular to the X direction. The features 306 traverse the first region 302 and extend into both the second regions 304 in this embodiment. In some embodiments, some of the features 306 may extend into one of the second regions 304, but not both. Further in the present embodiment, the features 306 have about uniform width $W_m$ and separated from each other by about uniform pitch $P_m$. Having uniform size and pitch in the features 306 may help improve lithography process window. The layout 300 further includes a feature 308 which is oriented lengthwise along the Y direction and is not connected to the standard cells in the regions 304. In an embodiment, the feature 308 is a dummy feature. In another embodiment, the feature 308 is a long interconnect. The layout 300 further includes vias (or via features) 310 in the first region 302. Each via 310 lands on one of the features 306 and connects the respective feature 306 to higher level interconnects (not shown).

In the present embodiment, the features 306 are mandrel patterns that correspond to local interconnect lines. In a further embodiment, each of the local interconnect lines is connected to standard cells in one of the second regions 304, but not both. To achieve this, the layout 300 further includes one or more cut layers having cut patterns that cut the features 306 into two or more segments. In the embodiment shown, the layout 300 includes two cut layers. The first cut layer includes cut patterns A in the first region 302 and cut patterns 312 in the second regions 304. The second cut layer includes cut patterns B in the first region 302 and cut patterns 314 in the second regions 304. Separating the cut patterns A, B, 312, and 314 into two cut layers may be performed by the module 138, by another module (not shown) in the mask data preparation 132, or by the design house 120. In embodiments, the features 306 may be mandrel patterns for other circuit features instead of local interconnect lines. For example, the features 306 may be mandrel patterns for fin structures.

In the present embodiment, each of the cut patterns 312 and 314 is a rectangular piece oriented lengthwise in the X direction. In contrast, the cut patterns A and B have relatively more complicated layout than the cut patterns 312 and 314 because the vias 310 cannot be cut by the cut patterns A and B. The complicated layout presents a challenge to mask and/or wafer manufacturing.

FIG. 3A illustrates a gap 318 between two adjacent cut patterns A, one of which is an elongated piece. FIG. 3A further illustrates a gap 328 between two adjacent cut patterns B, both of which are elongated pieces. The gaps 318 and 328 each have a size about $P_m$ along the X direction. As discussed with respect to FIG. 2A, the gaps 318 and 328 may present difficulty during mask and wafer manufacturing. The module 138 modifies the layout 300 to improve process window, for example, by replacing the elongated cut patterns A and B with smaller or square cut patterns as illustrated in FIGS. 3B-3E.

Figures 3B, 3C:
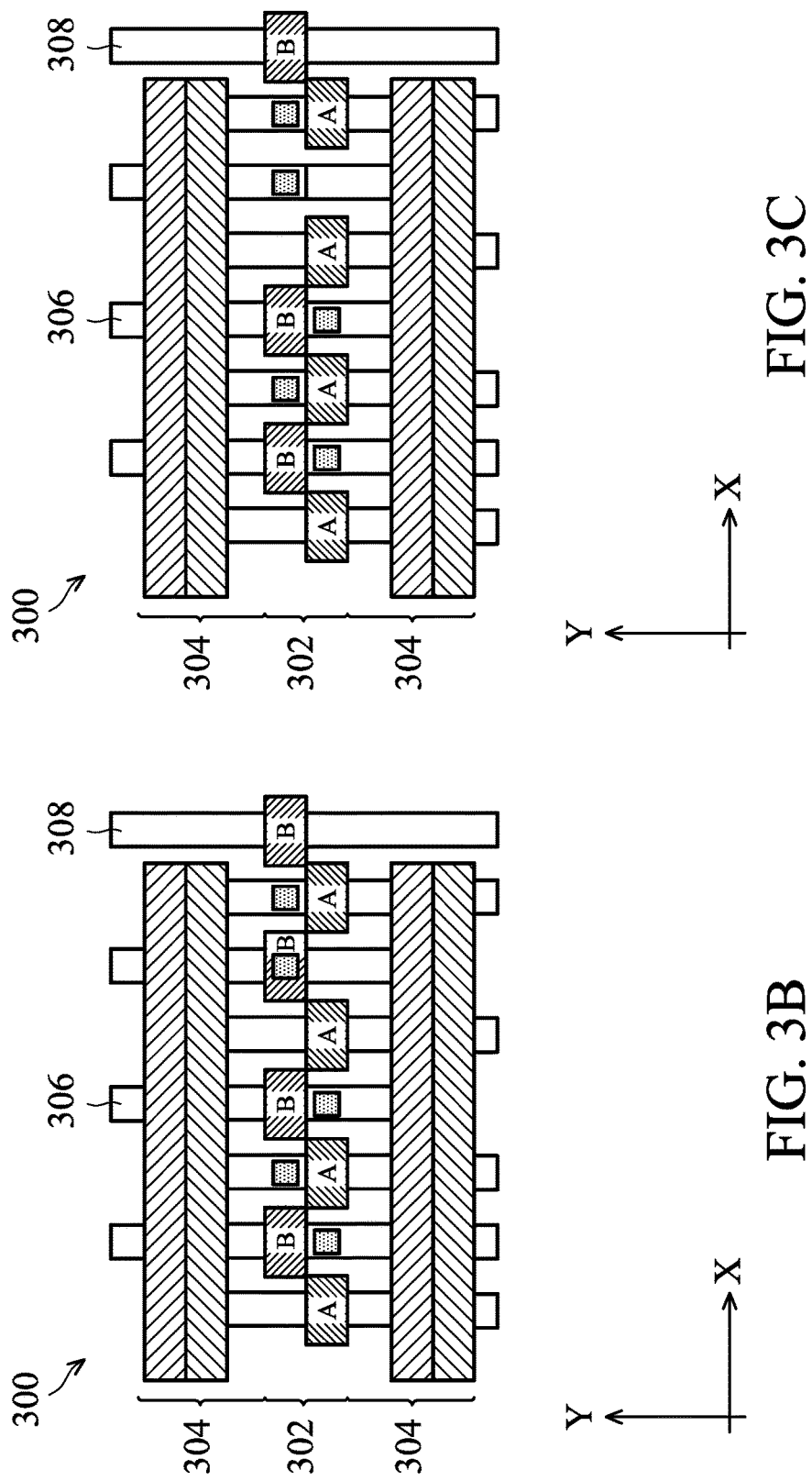

Referring to FIG. 3B, the module 138 replaces the cut patterns A and B with blocks in the first region 302. For ease of understanding, the blocks in the first cut layer are labeled with "A," and the blocks in the second cut layer are labeled with "B." The blocks are also cut patterns (or modified cut patterns) for the features 306. The width of each block A or B is about equal to $P_m$, and each of the blocks A and B cuts one and only one of the features 306. Further, the blocks A and B are arranged alternately over the features 306, as illustrated in FIG. 3B. Still further, at this step, the module 138 adds a block onto the feature 308. This block will be removed in a further step.

Figure 3E:
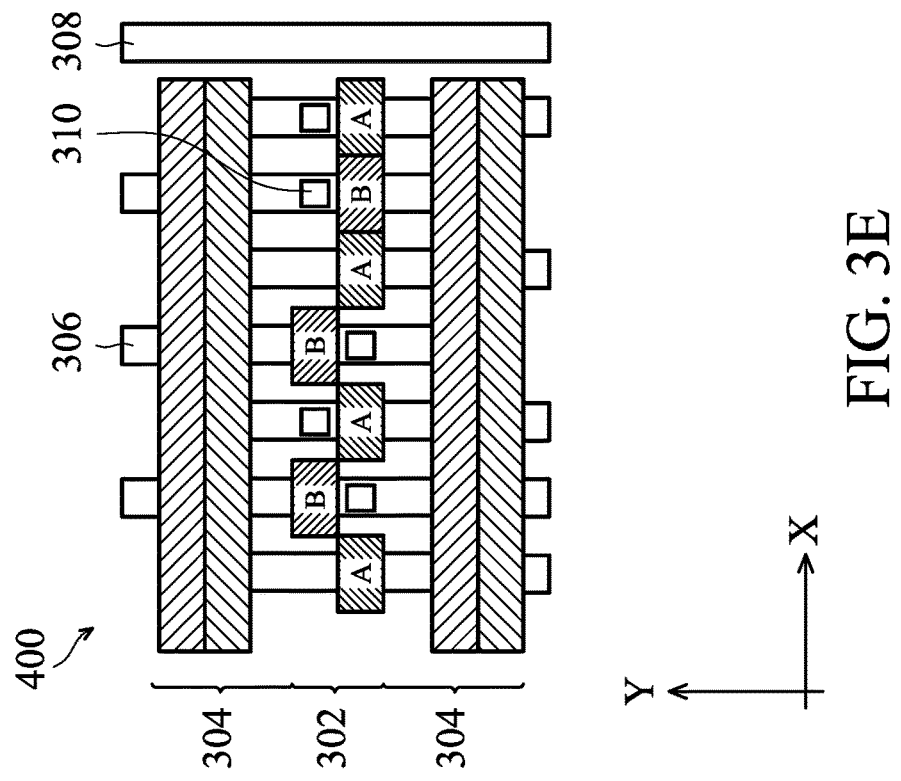
Figure 3D:
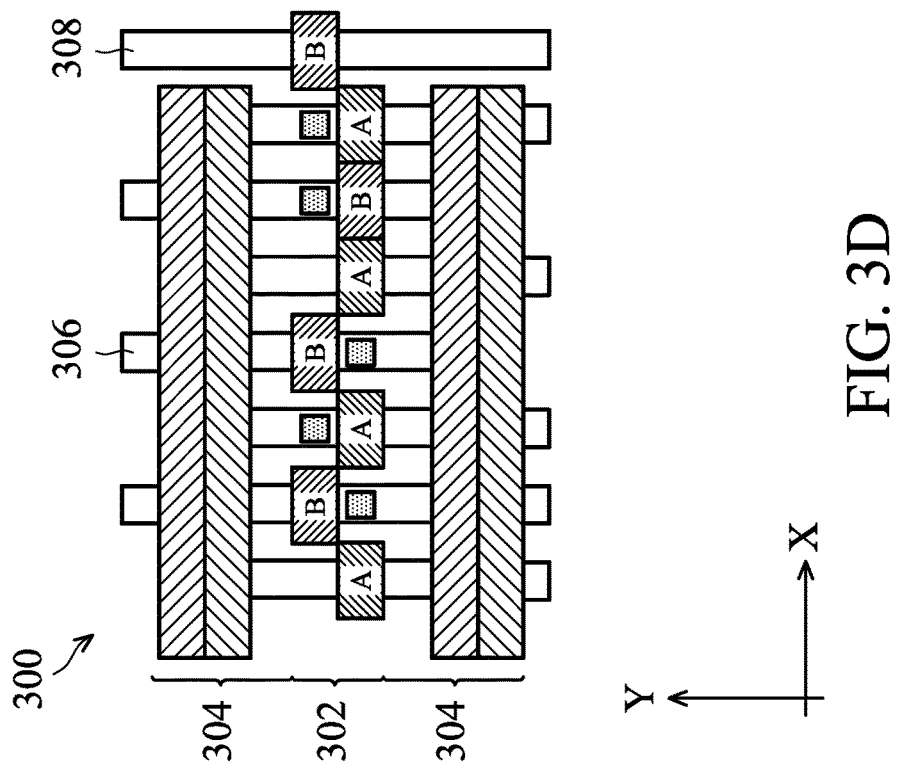

Next, the module 138 checks if any of the blocks A and B overlap the vias 310 in the first region 302. If a block overlaps a via 310 in the first region 302, then the module 138 shifts the respective block within the first region 302 such that it does not overlap the via. Taking FIG. 3B as an example, the third block B from the left overlaps with a via 310. The module 138 moves it down so that this block B does not overlap with the via 310, as shown in FIG. 3D. In the embodiment shown in FIG. 3D, the block B is moved to be aligned with the blocks A from a top view. Since the blocks A and B are at different cut layers, spacing between them is not a concern for mask and wafer fabrication.

In another embodiment, the shifting operation is accomplished by two steps: removing the respective block, and adding another block in the same cut layer at a different position. Taking FIG. 3B as an example, the module 138 may remove the third block B from the left, resulting in the layout 300 as shown in FIG. 3C. Then the module 138 adds a new block B to cut the same feature 306 at a position aligned with the blocks A from a top view, resulting in the layout 300 as shown in FIG. 3D. The module 318 checks to make sure that the new block B does not overlap with a via 310.

The module 138 also checks if any of the blocks A and B cut a feature that is not supposed to be cut, as shown in FIG. 3A. For example, the rightmost block B in FIG. 3B cuts the feature 308 which is not cut in FIG. 3A. Once this block is found, the module 138 removes it from the layout, resulting in the layout 300 such as shown in FIG. 3E. This ensures the modified layout (such as in FIG. 3E) matches the layout before the modification process (such as in FIG. 3A).

Referring to FIG. 3E, after the module 138 finishes the steps illustrated in FIGS. 3B-3E and discussed above, a modified layout 300 is obtained. Comparing the layout 300 in FIGS. 3A and 3E, the following observation is made. First, the total spacing between adjacent blocks A in the modified layout (which is about $3*P_m$ in FIG. 3E) is greater than the total spacing between adjacent patterns A in the pre-modification layout (which is about $2*P_m$ in FIG. 3A).

Second, the total length of the blocks A in the modified layout (which is about $4*P_m$ in FIG. 3E) is smaller than the total length of the patterns A in the pre-modification layout (which is about $5*P_m$ in FIG. 3A). Third, the total spacing between adjacent blocks B in the modified layout (which is about $2*P_m$ in FIG. 3E) is greater than the total spacing between adjacent patterns B in the pre-modification layout (which is about $1*P_m$ in FIG. 3A). Fourth, the total length of the blocks B in the modified layout (which is about $3*P_m$ in FIG. 3E) is smaller than the total length of the patterns B in the pre-modification layout (which is about $4*P_m$ in FIG. 3A).

Still comparing the layouts between FIGS. 3A and 3E, even though the minimum spacing in the first cut layer is the same between the two layouts, the modified layout in FIG. 3E is more manufacturer-friendly because the blocks A are shorter in length in FIG. 3E than the patterns A in FIG. 3A. Similarly, even though the minimum spacing in the second cut layer is the same between the two layouts, the modified layout in FIG. 3E is more manufacturer-friendly. The above first through fourth observations represent improvements in the modified layout over the pre-modification layout in terms of mask and/or wafer manufacturability. In various embodiments, the module 138 modifies the layout 122 to achieve one or more of the above first through fourth observations.

In some embodiments, the module 138 may employ two or more cut layers. While FIGS. 3B-3E represents an embodiment with two cut layers, FIGS. 4A-4D represents an embodiment with three cut layers. Person having ordinary skill in the art may derive other embodiments of the module 138 based on the teachings of FIGS. 3B-3E and FIGS. 4A-4D. The process embodied in FIGS. 4A-4D is briefly discussed below.

Figure 4A:
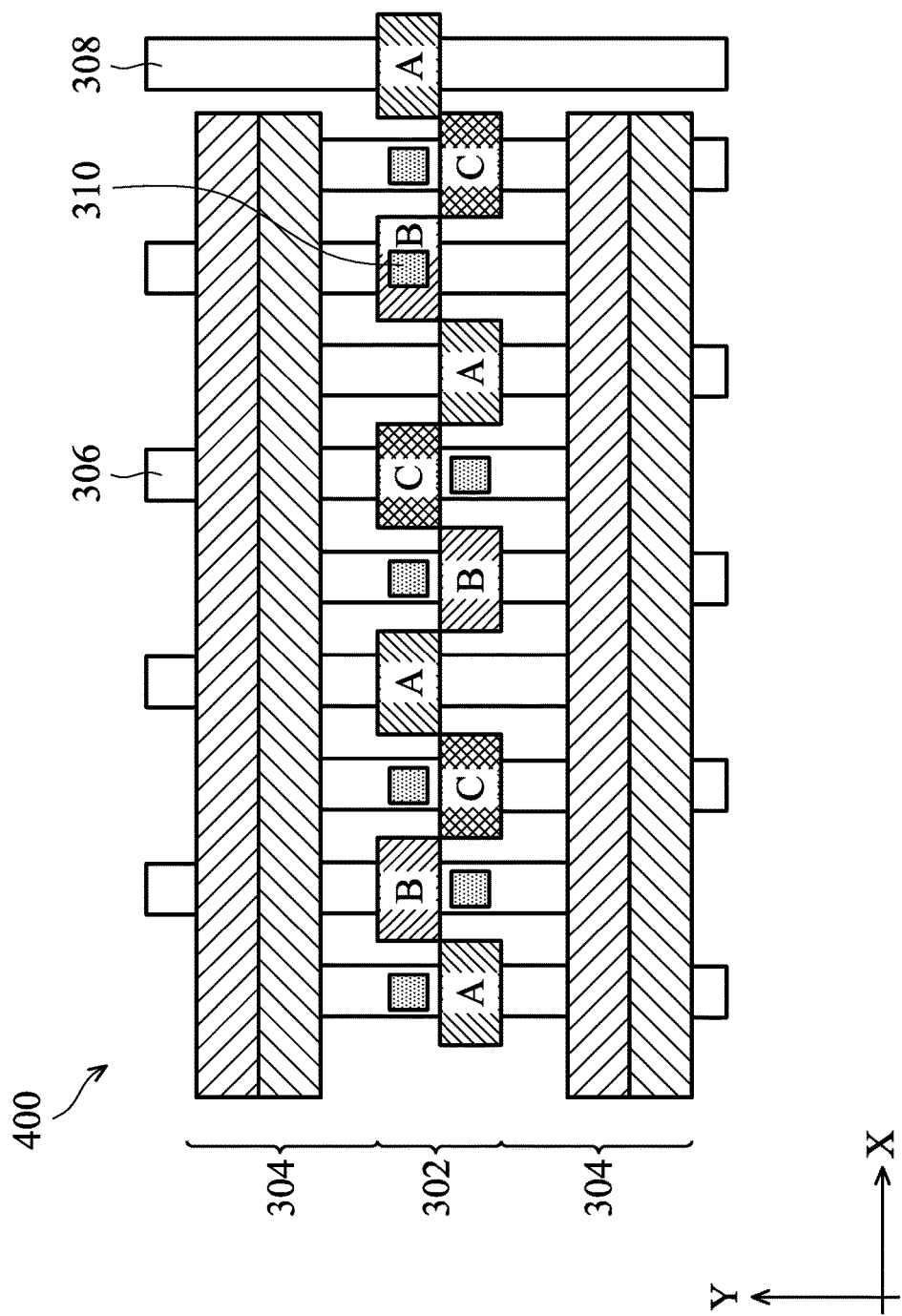
FIGS. 4A, 4B, 4C, and 4D illustrate an IC layout during various stages of another layout modification process, according to embodiments of the present disclosure.
Figure 5A:
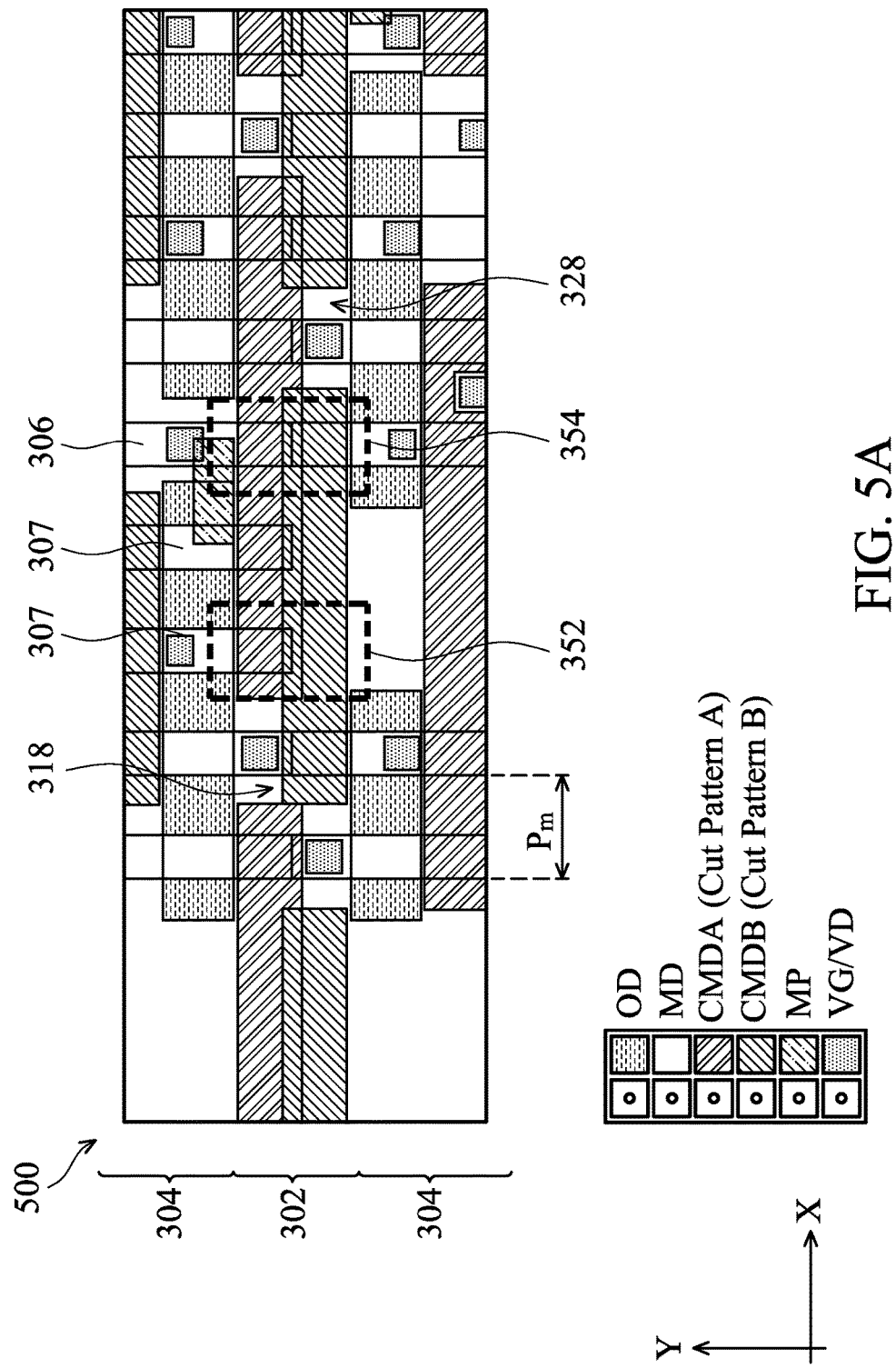
FIGS. 5A and 5B illustrate an IC layout before and after a layout modification process, according to embodiments of the present disclosure.
Figure 5B:
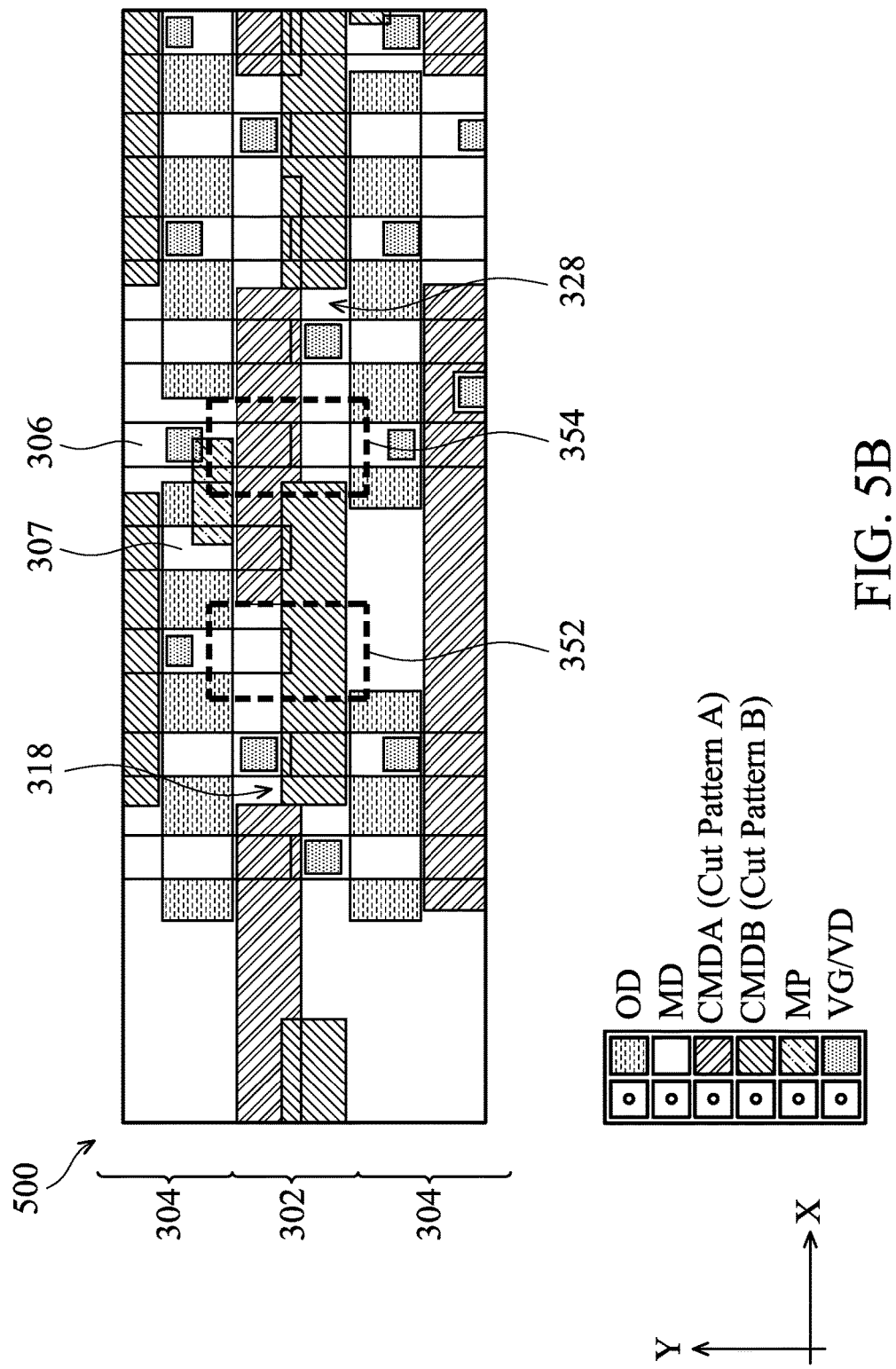

Referring to FIG. 4A, the module 138 replaces the cut patterns originally placed in the region 302 with blocks A, B, C in three cut layers, first, second, and third cut layers respectively. Each of the blocks A, B, C has a length about $P_m$. The blocks A, B, C are placed alternately on the features 306 and without regard to the via features 310 and the continuous feature 308 at this step.

Figure 4B:
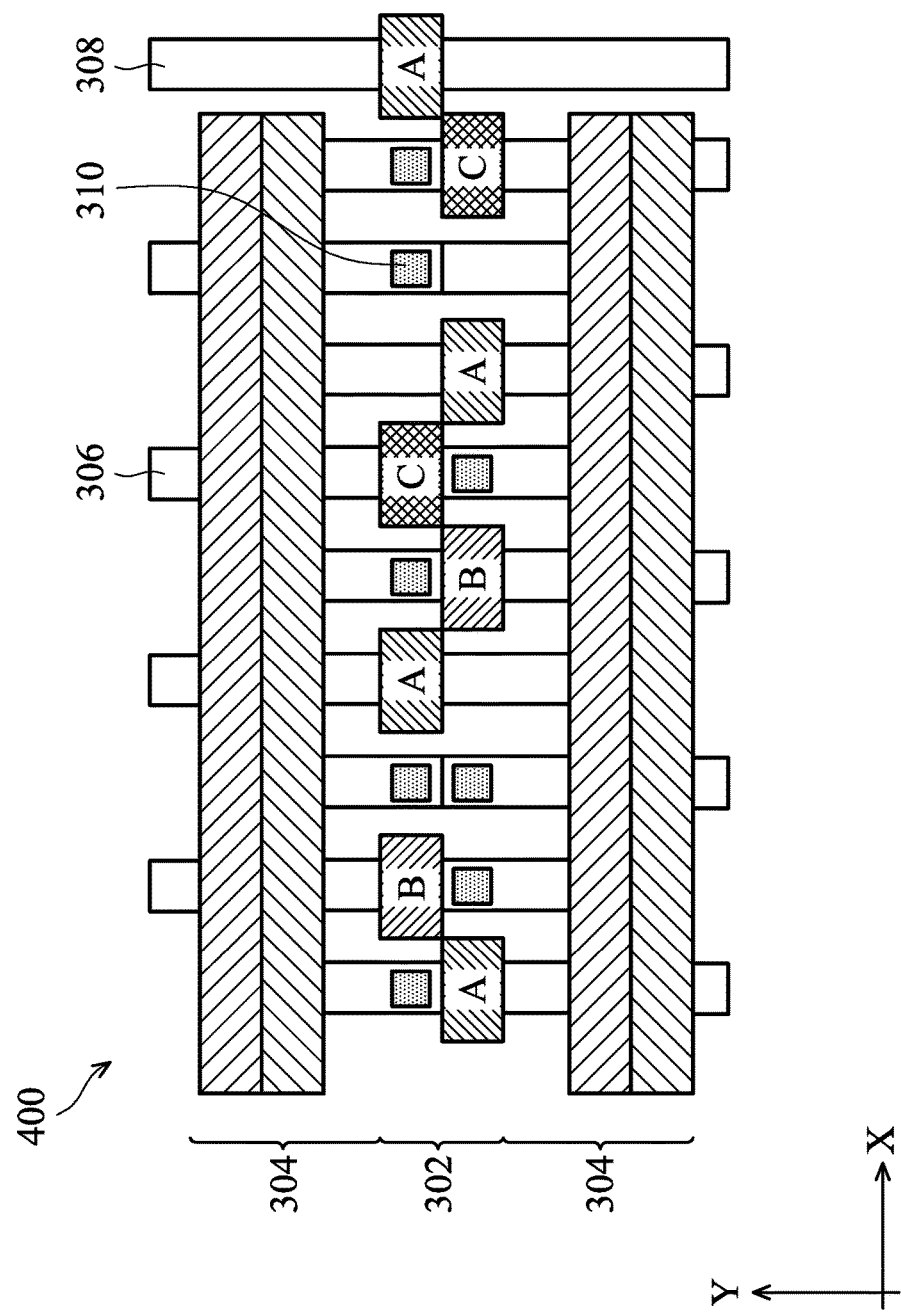

Next, the module 138 checks if any of the blocks A, B, and C overlaps with a via 310. If such a block is found, the module 138 removes it. For example, the first block C and the third block B from left in FIG. 4A are removed at this step, resulting the layout 400 as shown in FIG. 4B.

Figure 4C:
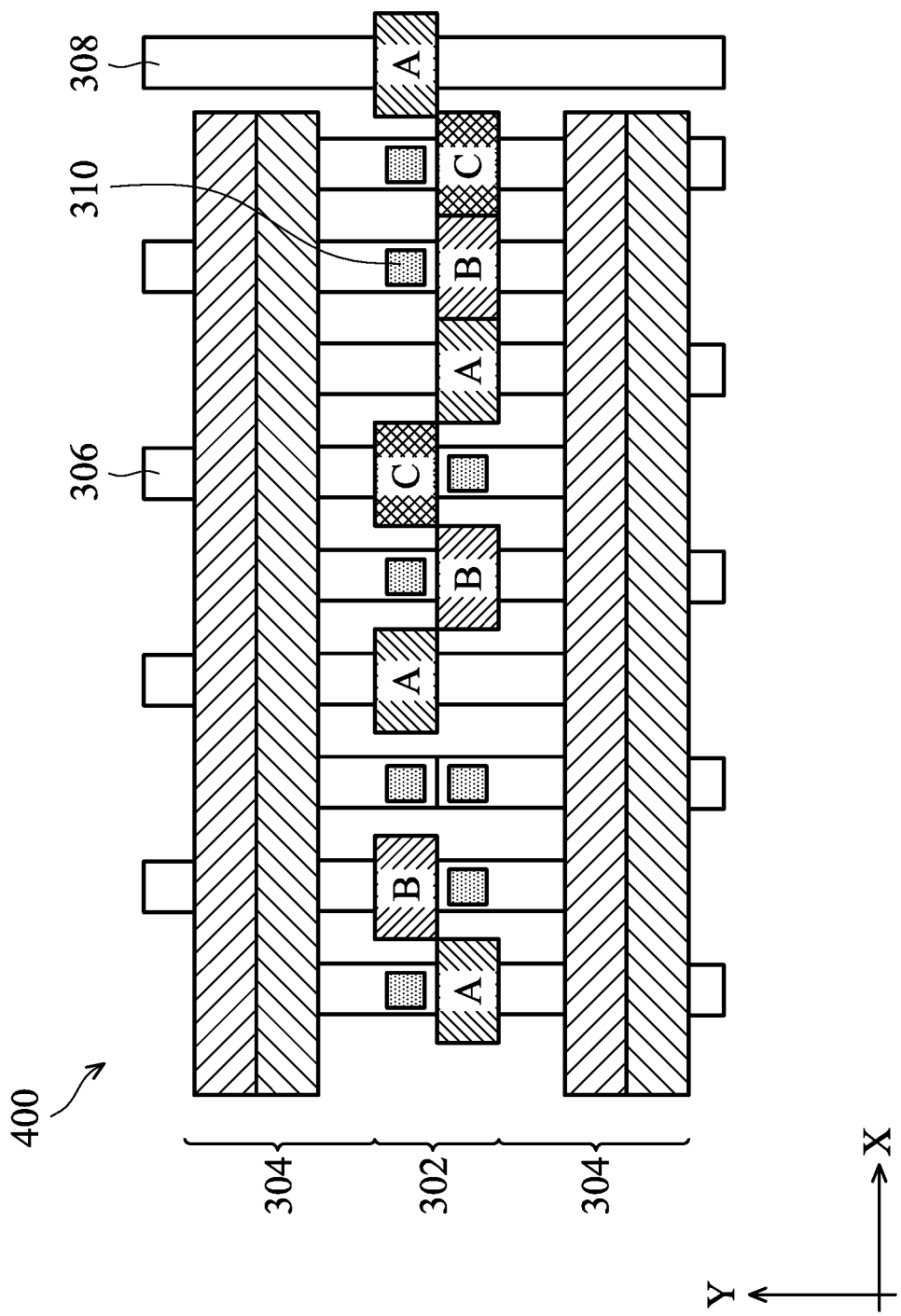

Referring to FIG. 4C, the module 138 adds a block B (the third block B from the left) onto a feature 306 which needs to be cut based on pre-modification layout (not shown). This effectively shifts the third B block on this feature 306 from a position overlapping with a via 310 (FIG. 4A) to another position not overlapping with the via 310 (FIG. 4C).

Figure 4D:
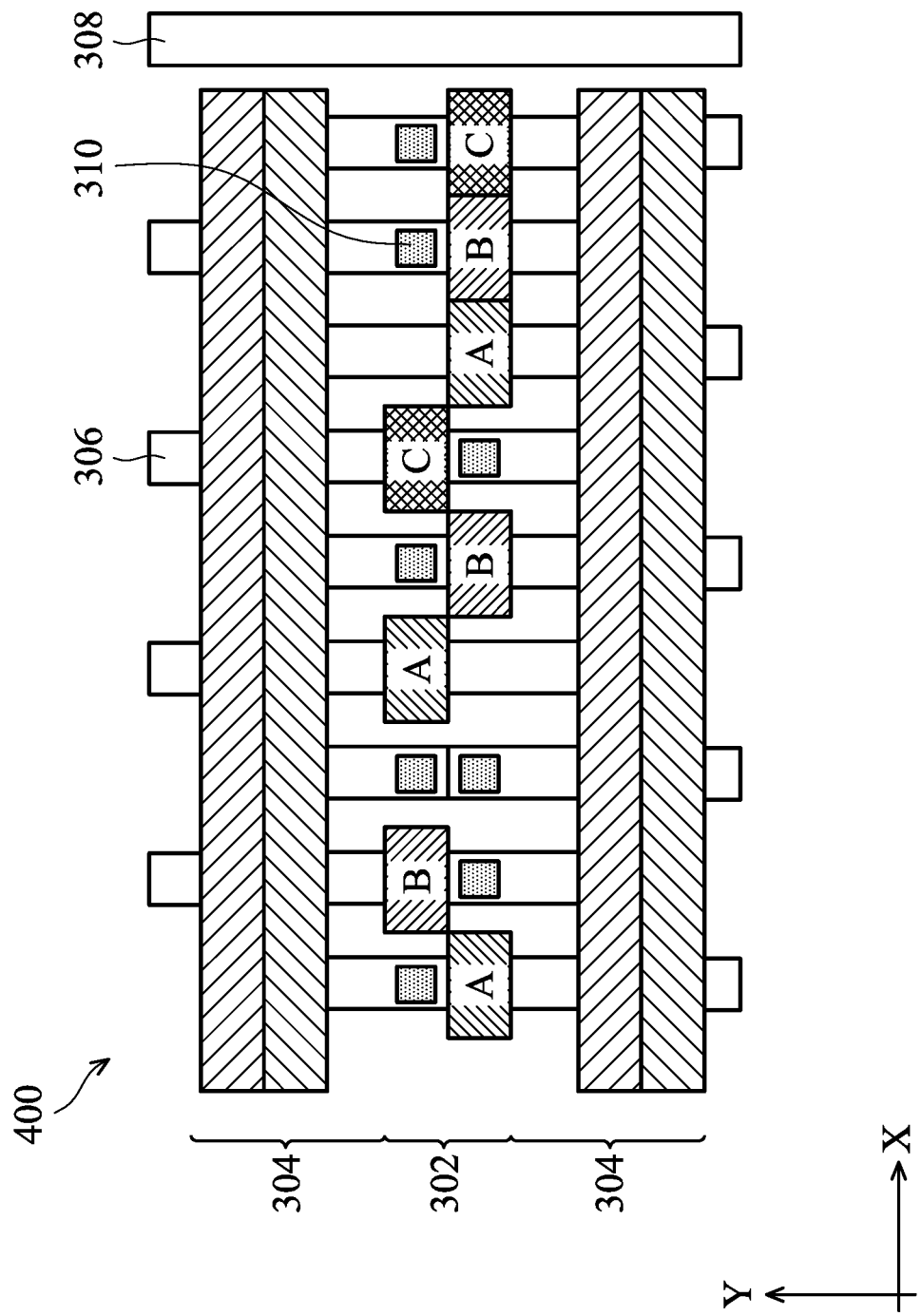

The module 138 also checks if any of the blocks A, B, and C cut a feature that is not cut in the pre-modification layout. For example, the rightmost block A in FIG. 4C cuts the feature 308 which is not supposed to be cut. Once this block is found, the module 138 removes it from the layout, resulting in the layout 400 as shown in FIG. 4D. This ensures the modified layout matches the layout before the modification process.

In embodiments, the module 138 may employ various other techniques to achieve the above first through fourth observations discussed with respect to FIG. 3E. In an embodiment, the module 138 does not replace the original cut patterns with cut blocks as shown in FIGS. 3A-4D. Instead, the module 138 identifies critical spacing between adjacent cut patterns (e.g. spacing less than $2*P_m$) and checks if any of the mandrel features adjacent the critical spacing is overlapped by more than one cut patterns of different cut layers. If such mandrel feature is found, the module 138 reduces the length of one of the cut patterns such that it no longer cuts this mandrel feature. This effectively reduces the total length of the cut patterns in the respective cut layer, as well as increases the spacing of the cut patterns in the respective cut layer. FIGS. 5A-5B and FIGS. 7A-7C illustrate two examples where the module 138 may implement such technique.

Referring to FIG. 5A, the layout 500 includes various features similar to those described with respect to the layout 300 (FIG. 3A). The layout 500 further includes some features 307 having an end in the first region 302 and extending into one of the two second regions 304 but not both. In the present embodiment, the modification of cut patterns on such features 307 is handled differently than the modification of cut pattern on features 306.

In an embodiment, the module 138 identifies critical spacing in the layout 500, such as spacing 318 in the first cut layer, and spacing 328 in the second cut layer. Each of the spacing 318 and 328 has a width about equal to the pitch $P_m$ of the mandrel features 307 and 306. The respective cut patterns adjacent the spacing 318 and 328 are long patterns. As discussed with respect to FIG. 2A, such layout presents difficulty for mask and wafer fabrication.

The module 138 also identifies two features 307 and 306 that are adjacent the spacing 318 and 328 respectively, and are cut by both cut patterns A and B. This is illustrated in FIG. 5A by the dotted boxes 352 and 354, each having a width about $P_m$ along the X direction. Because the mandrel feature is cut by two cut patterns, one of the cut patterns may be removed. The module 138 decides which cut pattern is removed, as discussed below.

With respect to the box 354, reducing the length of the cut pattern B in the box 354 increases the width of the spacing 328, while reducing the length of the cut pattern A in the box 354 does not increase the width of either spacing 318 or spacing 328. Therefore, the portion of the cut pattern B in the box 354 is removed, and the cut pattern A in the box 354 is kept.

With respect to the box 352, the same analysis is performed. The portion of the cut pattern A in the box 352 is removed, and the cut pattern B in the box 352 is kept. The resultant layout 500 is shown in FIG. 5B, where both the spacing 318 and 328 are enlarged compared with FIG. 5A. The module 138 may increase other critical spacing using the same method.

By performing the above operations, at least one of the following conditions is met: (1) the total spacing between adjacent patterns A in the modified layout is greater than the total spacing between adjacent patterns A in the pre-modification layout; (2) the total length of the patterns A in the modified layout is smaller than the total length of the patterns A in the pre-modification layout; (3) the total spacing between adjacent patterns B in the modified layout is greater than the total spacing between adjacent patterns B in the pre-modification layout; and (4) the total length of the patterns B in the modified layout is smaller than the total length of the patterns B in the pre-modification layout.

Figure 6A:
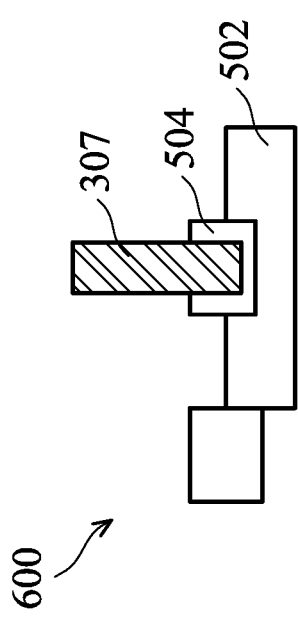
FIG. 6A illustrates an IC layout, according to embodiments of the present disclosure.
Figure 6C:
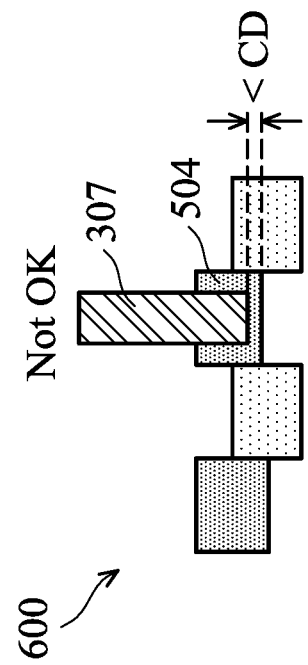
FIG. 6C illustrates an example rejected by a layout modification process applied to FIG. 6A.
Figure 6B:
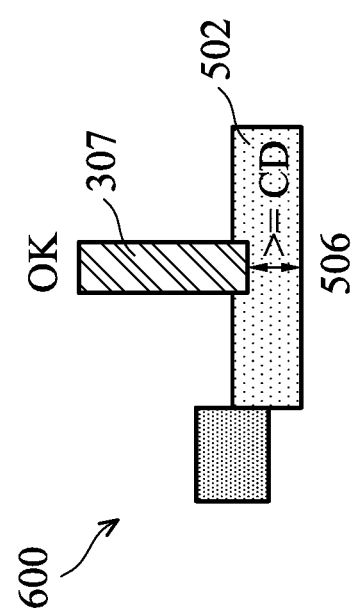
FIG. 6B illustrates an example produced by a layout modification process applied to FIG. 6A.
Figure 7A:
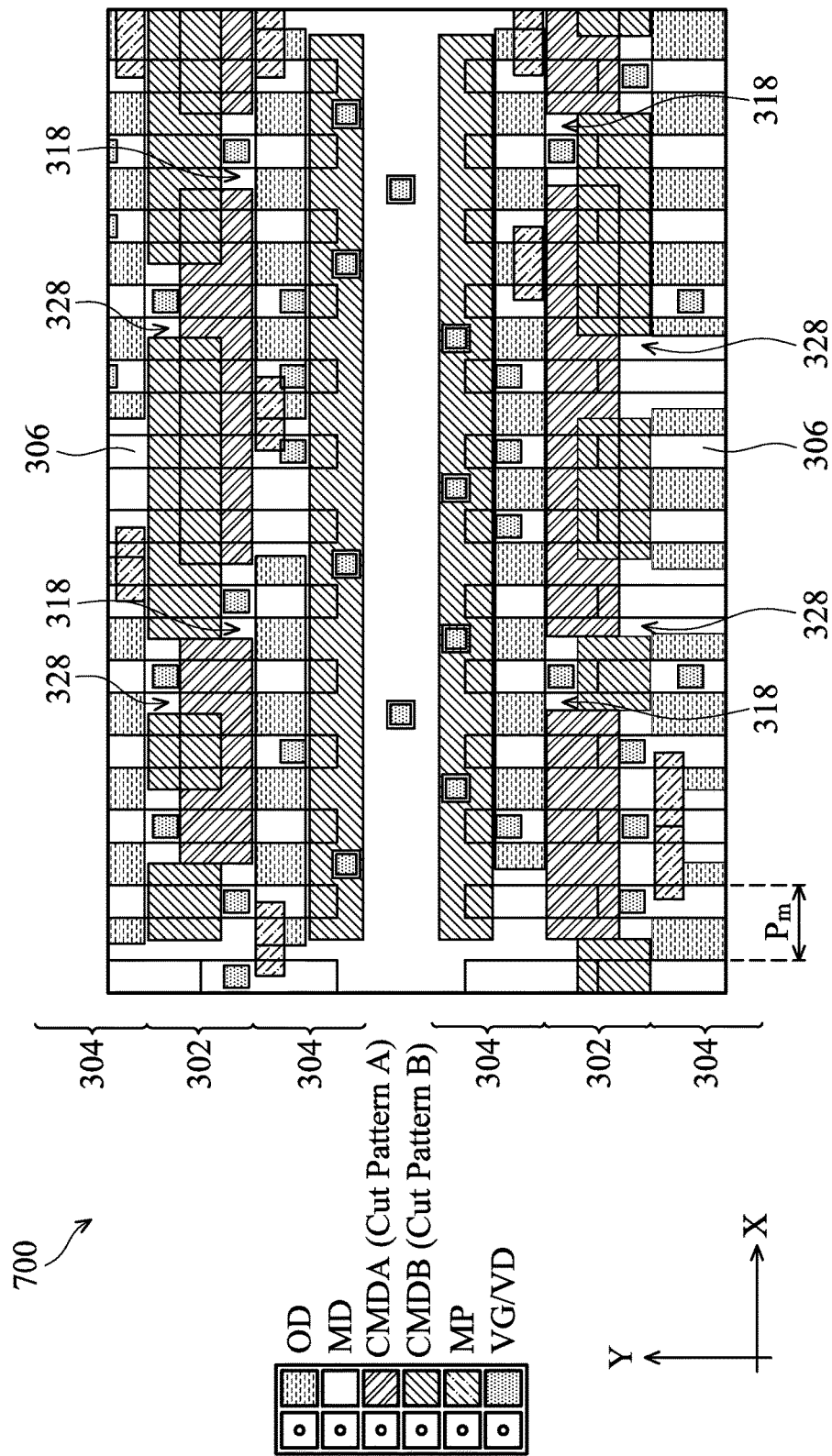
FIGS. 7A, 7B, and 7C illustrate another IC layout before and after a layout modification process, according to embodiments of the present disclosure.
Figure 7B:
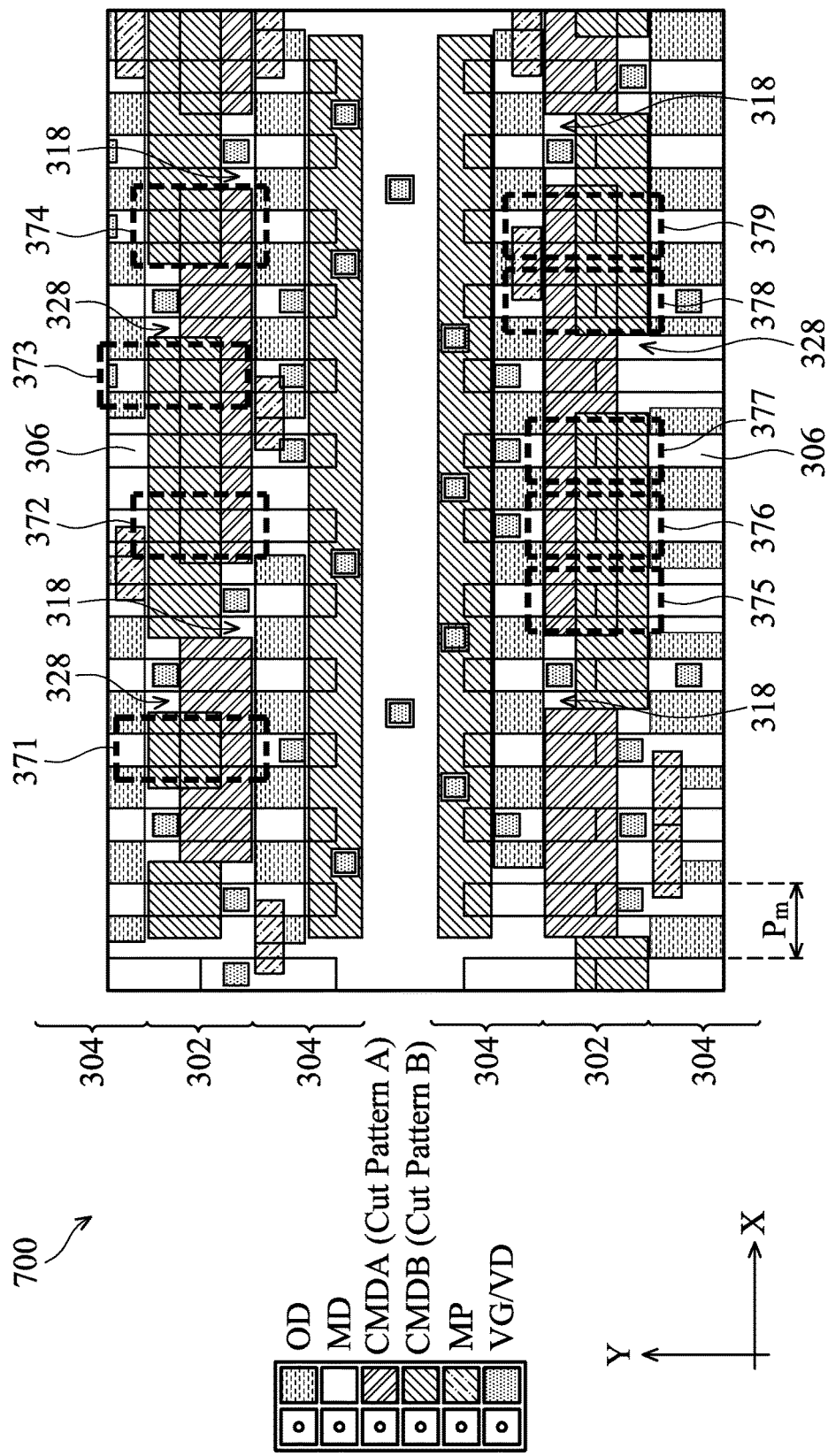
Figure 7C:
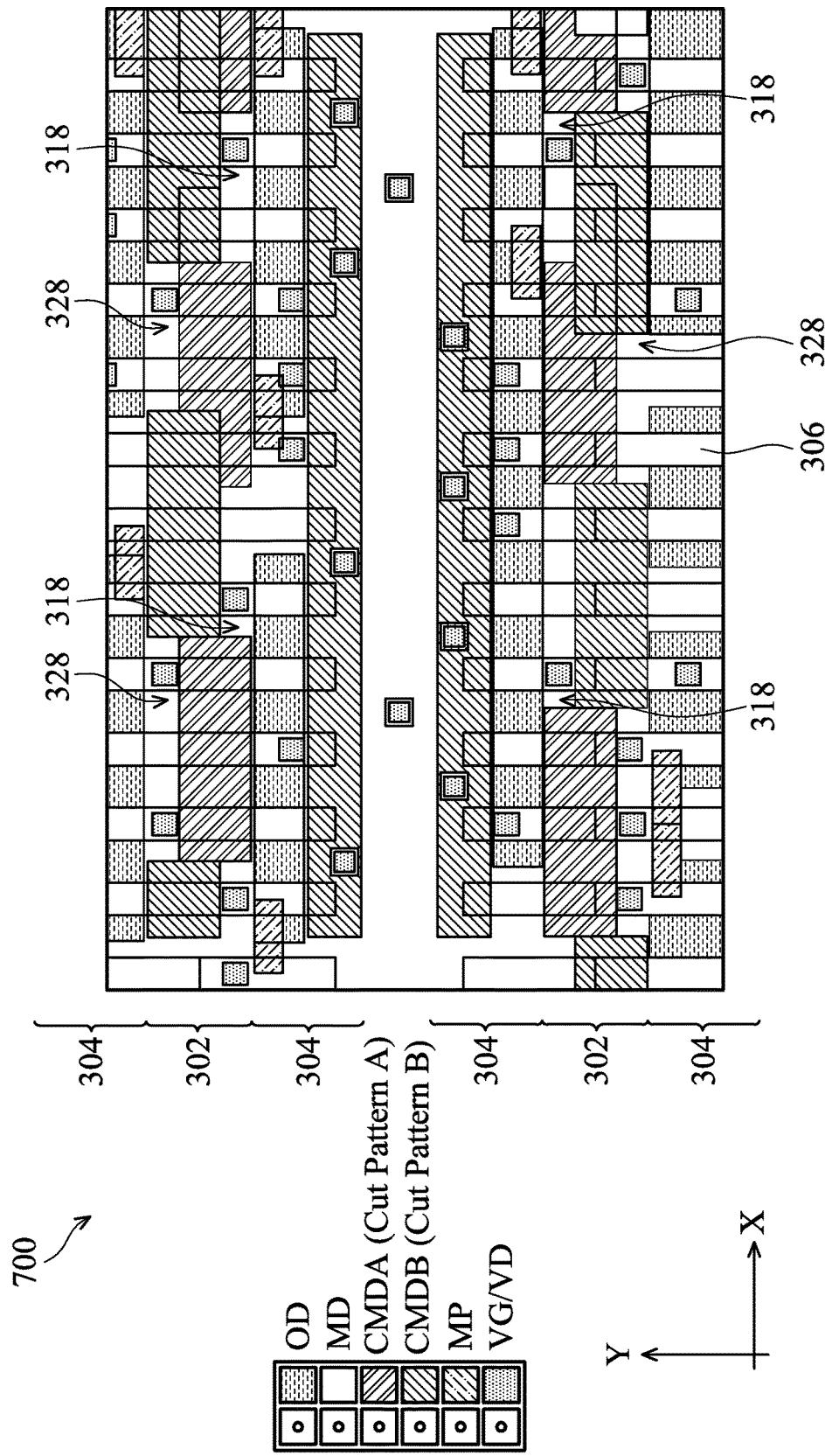

In the present embodiment, since the box 352 relates to the feature 307 (having an end in the region 302), the module 138 performs a further analysis to validate the above cut pattern removal decision, which is illustrated in FIG. 6A-6C. Referring to FIG. 6A, a layout 600 includes a feature 307 having an end being cut by two cut patterns 502 and 504. FIG. 6B illustrates a modified layout where the cut pattern 504 is removed. The end of the feature 307 is sufficiently covered by the cut pattern 502 with a margin 506 within the cut pattern that is greater than or equal to a critical dimension CD. Therefore, the modified layout 600 in FIG. 6B is deemed acceptable by the module 138. FIG. 6C illustrates a modified layout where the cut pattern 502 is removed. The end of the feature 307 is insufficiently covered by the cut pattern 504 with a margin 508 within the cut pattern 504 that is less than the critical dimension CD. The insufficient margin might lead to a scenario where the end of the feature 307 is not properly cut. Therefore, the modified layout 600 in FIG. 6C is rejected by the module 138. The same acceptance (FIG. 6B) and rejection (FIG. 6C) would be made if the cut pattern 504 does not cover the end of the feature 307 while the cut pattern 502 covers the end of the feature 307. In the example shown in FIGS. 5A and 5B, the cut pattern removal in the box 352 is similar to the scenario illustrated in FIG. 6B, and is therefore acceptable. On the other hand, if the module 138 finds that the cut pattern removal is unacceptable, it may undo the changes and seek other options to increase the process window.

FIGS. 7A, 7B, and 7C illustrate another example where the module 138 modifies a layout by identifying critical spacing, identifying portions of cut patterns that are removable, and partially removing the cut patterns accordingly. FIGS. 7A, 7B, and 7C are briefly discussed below.

Referring to FIG. 7A, the module 138 receives the layout 700 with first regions 302, second regions 304, features 306, cut patterns A in a first cut layer, and cut patterns B in a second cut layer. The module 138 identifies critical spacing, such as spacing 318 in the first cut layer, and spacing 328 in the second layer (FIG. 7A may or may not show all critical spacing).

Of particular interest is the bottom-left critical spacing 328 where the cut patterns B can be extended to eliminate the critical spacing 328. In the present embodiment, the module 138 extends the cut patterns B to eliminate this critical spacing 328. The resultant layout 700 is shown in FIG. 7B. It is noted that other critical spacing may be eliminated by this method as well.

Next, the module 138 identifies portions of the cut patterns A and B that are removable, as illustrated by the dotted boxes 371, 372, 373, 374, 375, 376, 377, 378, and 379. Each of the boxes has a width about $P_m$ in this embodiment.

Next, the module 138 decides which of the removable portions of the cut patterns A and B in the boxes 371-379 are to be removed, and subsequently remove them. In the present embodiment, the portions of the cut patterns A in the boxes 372, 374, 375, 376, and 379 are removed; and the portions of the cut patterns B in the boxes 371, 373, and 377 are removed. The resultant layout 700 is shown in FIG. 7C. It is noted that either pattern A or pattern B in the box 378 may also be removed in another embodiment.

Next, the module 138 may perform the checking illustrated in FIGS. 6A-6C.

Figure 8B:
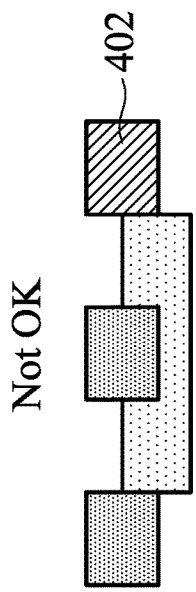
FIGS. 8B, 8C, and 8D illustrate examples that are rejected by a layout modification process applied to FIG. 8A.
Figure 8C:
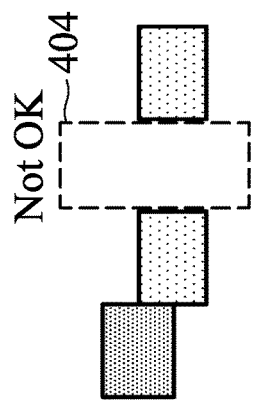
Figure 8D:
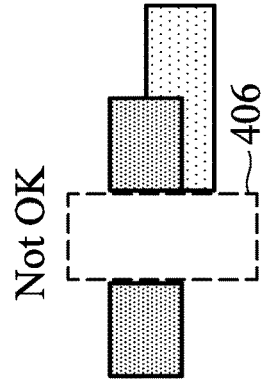
Figure 8A:
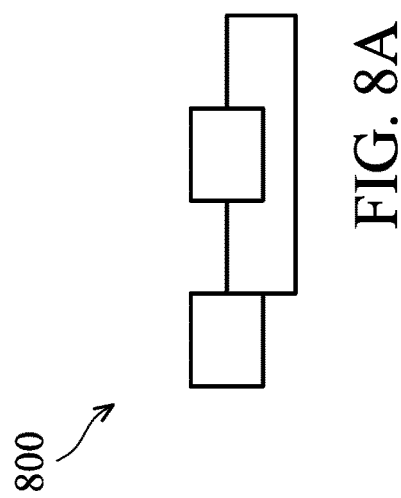
FIG. 8A illustrates an IC layout, according to embodiments of the present disclosure.

Next, the module 138 may perform other checking to ensure that the modified layout matches the pre-modification layout in terms of circuit functionality. Some of the other checking are illustrated in FIGS. 8A-8D. FIG. 8A illustrate a layout 800 (cut patterns only) prior to modification by the module 138. FIGS. 8B-8D each illustrates a modified cut pattern layout that is rejected by the module 138. In FIG. 8B, a cut pattern 402 is placed in an area of the layout which is not supposed to be cut. In FIG. 8C, all cut patterns in an area 404 are removed, leaving no cut pattern in the area 404. In FIG. 8D, a single cut pattern in an area 406 is removed, leaving no cut pattern in the area 406.

Referring back to FIG. 1, after mask data preparation 132 modifies the IC layout 122, a mask 146 or a group of masks 146 are fabricated based on the modified IC layout during mask fabrication 144. For example, an electron-beam (e-beam) or a mechanism of multiple e-beams is used to form a pattern on a mask (photomask or reticle) based on the modified IC design layout. The mask 146 can be formed in various technologies. In one embodiment, the mask 146 is formed using binary technology. To further this embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask 146 is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art. In yet another example, the mask 146 is formed to be a reflective mask. For example, a reflective mask may include a low thermal expansion material (LTEM) layer, a reflective multilayer (ML) over the LTEM layer, an absorber layer over the ML, and other layers. The ML is designed to reflect a radiation such as an extreme ultraviolet (EUV) light having a wavelength of about 1-100 nm. The absorber layer is designed to have certain mask patterns that determine how the radiation is reflected or absorbed. In the present embodiment, the mandrel and cut patterns prepared by the module 132 are formed on the masks 146. Particularly, the mandrel patterns, the modified cut patterns A, and the modified cut patterns B may be formed in separate masks. The masks 146 may include other layers in addition to the layers having the mandrel and cut patterns. Because the mandrel-cut pattern preparation module 138 produces layouts with enlarged process window for the mask fabrication, the quality of the masks 146 is improved.

The fab 150, such as a semiconductor foundry, uses the masks 146 to fabricate the IC device 160. The IC manufacturer 150 is an IC fabrication business that can include a myriad of manufacturing facilities for the fabrication of a variety of different IC products. For example, there may be a first manufacturing facility for the front end fabrication of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer 152 is fabricated using the masks 146 to form the IC device 160. The semiconductor wafer 152 includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer 152 may further include various doped regions, fin features, gate electrodes, dielectric features, and multilevel interconnects.

In the present embodiment, the semiconductor wafer 152 is manufactured by the fab 150 using a variety of processes including a mandrel-cut patterning process 154. For example, the process 154 forms a layer of material on the wafer 152, and performs a photolithography process to the layer to form mandrel patterns. The photolithography process uses the mask 146 with the mandrel patterns 306 and 307 for example. The mandrel patterns may be local interconnect lines in an embodiment. Then, the process 154 performs a photolithography process using the mask 146 with the modified cut patterns A to produce a first set of etch masking elements; and etches the mandrel patterns through the first set of etch masking elements. Then, the process 154 performs another photolithography process using the mask 146 with the modified cut patterns B to produce a second set of etch masking elements; and etches the mandrel patterns through the second set of etch masking elements. In this manner, the modified cut patterns A and B collectively cut the mandrel patterns. Due to the enhancement to the cut patterns A and B by the data preparation 132, the process window for the photolithograph processes is enlarged. In another embodiment, the process 154 may perform a photolithography process using the mask 146 with the modified cut patterns A to produce a first set of etch masking elements; perform another photolithography process using the mask 146 with the modified cut patterns B to produce a second set of etch masking elements merged with the first set of etch masking elements; and etch the mandrel patterns through the first and second sets of etch masking elements. Various other embodiments of using the masks 146 can alternatively or additionally be implemented by the fab 150.

Figure 9:
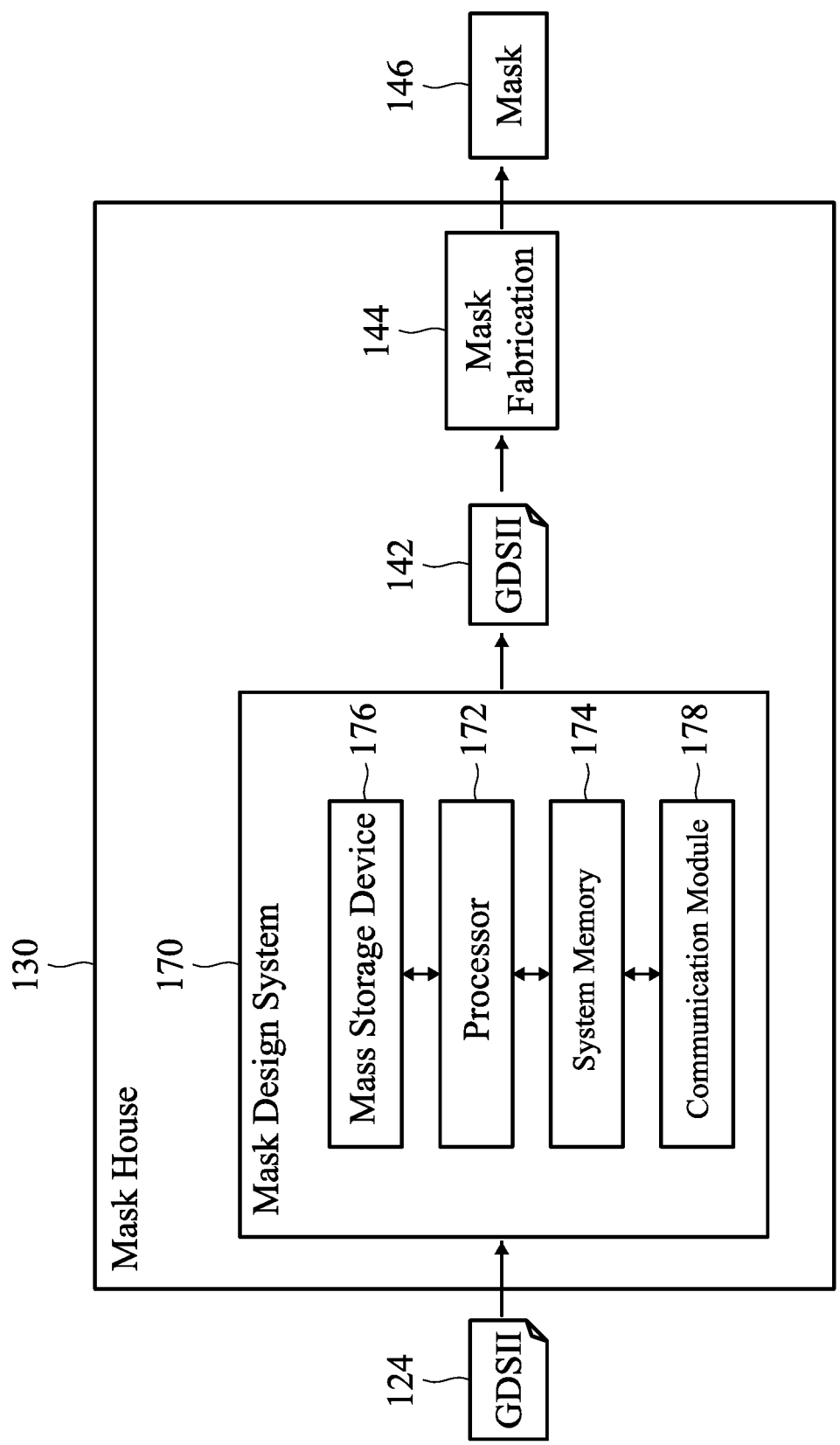
FIG. 9 is an example of a mask house tool used by the mask house of FIG. 1, according to various aspects of the present disclosure.

FIG. 9 is a more detailed block diagram of the mask house 130 shown in FIG. 1 according to various aspects of the present disclosure. In the illustrated embodiment, the mask house 130 includes a mask design system (or a mask house tool) 170 that is operable to perform the functionality described in association with mask data preparation 132 of FIG. 1. The mask design system 170 is an information handling system such as a computer, server, workstation, or other suitable device. The system 170 includes a processor 172 that is communicatively coupled to a system memory 174, a mass storage device 176, and a communication module 178. The system memory 174 provides the processor 172 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 176. Examples of mass storage devices may include hard discs, optical disks, magneto-optical discs, solid-state storage devices, and/or a variety other mass storage devices known in the art. The communication module 178 is operable to communicate information such as IC design layout files with the other components in the IC manufacturing system 100, such as the design house 120. Examples of communication modules may include Ethernet cards, 802.11 WiFi devices, cellular data radios, and/or other suitable devices known in the art.

In operation, the mask design system 170 is configured to manipulate the IC layout 122, including generating mandrel patterns and cut patterns, and/or modifying cut patterns to enhance process window for mask and wafer fabrication. For example, in an embodiment, mandrel-cut pattern preparation 138 may be implemented as software instructions executing on the mask design system 170. In such an embodiment, the mask design system 170 receives a first GDSII file 124 containing the IC layout 122 (or various embodiments 300, 400, 500, and 700) from the design house 120. Then, the mask design system 170 modifies the layout using various techniques discussed above with respect to mandrel-cut pattern preparation 138. After the layout is modified to enhance manufacturability thereof, the mask design system 170 transmits to the mask fabrication 144 a second GDSII file 142 containing a design layout having the mandrel patterns and the modified cut patterns. In alternative embodiments, the IC layout 122 may be transmitted between the components in IC manufacturing system 100 in alternate file formats such as DFII, CIF, OASIS, or any other suitable file type. Further, the mask design system 170 and the mask house 130 may include additional and/or different components in alternative embodiments. By implementing processes related to cut pattern modification according to the present disclosure, the mask design system 170 is able to produce layouts with higher quality for mask and/or wafer fabrication.

Figure 10:
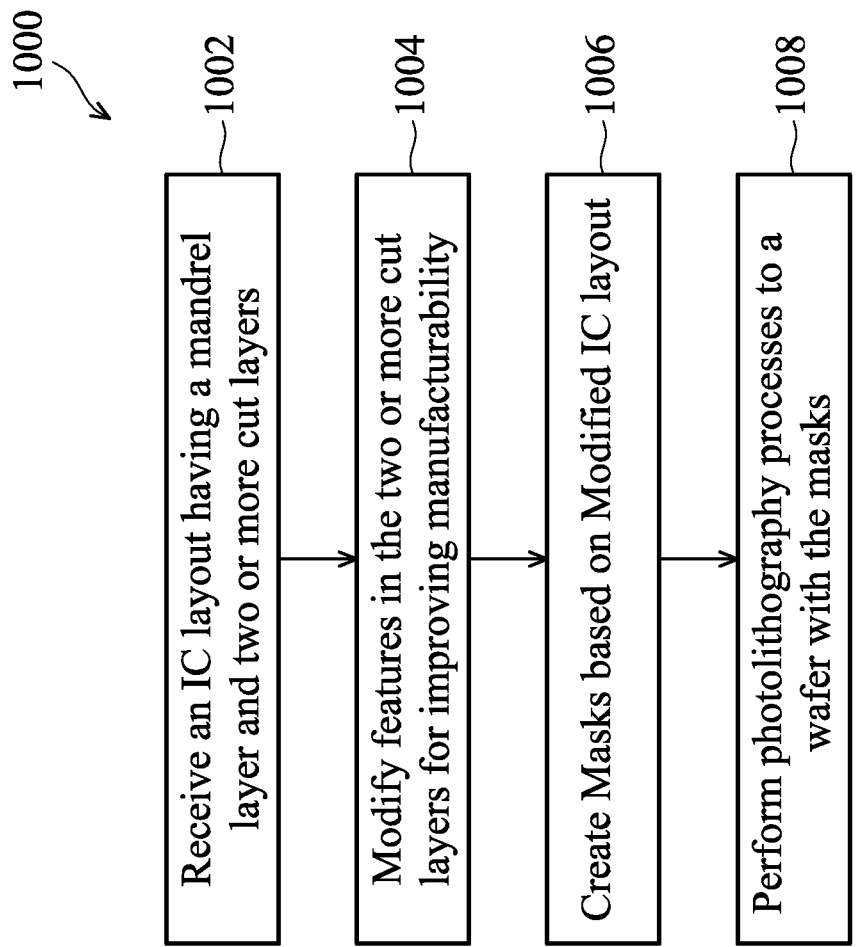
FIG. 10 is a flow chart of a method of designing or modifying cut patterns according to one or more embodiments of the present disclosure.

Referring now to FIG. 10, illustrated therein is a flow chart of a method 1000 for manufacturing an IC device using mandrel-cut double patterning technique, according to various aspects of the present disclosure. The method 1000 may be implemented, in whole or in part, by the system 100 (FIG. 1). It is understood that additional operations can be provided before, during, and after the method 1000, and some operations described can be replaced, eliminated, or moved around for additional embodiments of the method. The method 1000 is an example, and is not intended to limit the present disclosure beyond what is explicitly recited in the claims. The method 1000 includes operations 1002, 1004, 1006, and 1008. Many aspects of these operations have been discussed above with respect to FIGS. 1-9. For the purposes of simplicity, these operations are briefly discussed below.

At operation 1002, the method 1000 receives a target IC design layout having a mandrel layer and two or more cut layers. For example, the target IC design layout may be the layout 300, 400, 500, or 700, as discussed above or other suitable layouts.

At operation 1004, the method 1000 modifies cut patterns in the two or more cut layers to improve the manufacturability of these layers for mask and/or wafer fabrication. In an embodiment, the operation 1004 includes replacing the cut patterns with cut blocks (or modified cut patterns), shifting the cut blocks to avoid cutting via features, and eliminating extraneous cut blocks. This and other embodiments have been discussed with respect to FIGS. 3A-3E and 4A-4D. In another embodiment, the operation 1004 includes identifying critical spacing, identifying removable portions of the cut patterns, and removing certain removable portions of the cut patterns. This and other embodiments have been discussed with respect to FIGS. 5A-5B and 7A-7C.

At operation 1006, the method 1000 creates masks based on the modified IC layout. Particularly, the operation 1006 creates separate masks for the mandrel patterns and the modified cut patterns in the present embodiment.

At operation 1008, the method 1000 performs photolithography processes with the masks in manufacturing one or more wafers.

Although not intended to be limiting, one or more embodiments of the present disclosure provide many benefits to IC design and manufacturing. For example, embodiments of the preset disclosure provide efficient and effective methods for designing or modifying cut patterns for an IC layout. In some embodiments, the resultant cut patterns have enlarged spacing between adjacent ends of the cut patterns. The enlarged spacing improves the manufacturability of the layout during mask and/or wafer fabrication. In some embodiments, the resultant cut patterns have smaller geometric sizes which remain substantially unchanged during manufacturing processes. This also improves the manufacturability of the layout during mask and/or wafer fabrication.

In one exemplary aspect, the present disclosure is directed to a method for integrated circuit (IC) manufacturing. The method includes receiving a layout of the IC having a first region interposed between two second regions, the first and second regions oriented lengthwise along a first direction. The layout includes a first layer having first features oriented lengthwise along a second direction perpendicular to the first direction, the first features traversing the first region and extending into both the second regions. The layout further includes a second layer having second features in the first region, the second features oriented lengthwise along the first direction. The layout further includes a third layer having third features in the first region, the third features oriented lengthwise along the first direction. The second and third features collectively form cut patterns for the first features. The method further includes modifying the second and third features by a mask house tool, resulting in modified second features and modified third features, wherein the modified second and third features collectively form modified cut patterns for the first features. The modifying of the second and third features meets at least one of following conditions for improving mask and wafer manufacturability of the layout: (1) total spacing between adjacent modified second features is greater than total spacing between adjacent second features, (2) total length of the modified second features is smaller than total length of the second features, (3) total spacing between adjacent modified third features is greater than total spacing between adjacent third features, and (4) total length of the modified third features is smaller than total length of the third features.

In another exemplary aspect, the present disclosure is directed to a method for integrated circuit (IC) manufacturing. The method includes receiving a layout of the IC having a first region interposed between two second regions, the first and second regions oriented lengthwise along a first direction. The layout includes a first layer having first features oriented lengthwise along a second direction perpendicular to the first direction, the first features traversing the first region and intersecting the second regions. The layout further includes a second layer having second features in the first region, the second features oriented lengthwise along the first direction. The layout further includes a third layer having third features in the first region, the third features oriented lengthwise along the first direction. The second and third features collectively form cut patterns for the first features. The method further includes modifying the second and third features by a mask house tool for improving mask and wafer manufacturability of the layout, resulting in modified second features and modified third features, wherein the modified second and third features collectively form modified cut patterns for the first features. The modifying of the second and third features includes: replacing the second and third features with blocks in the first region on the second and third layers respectively, wherein each of the blocks cuts only one of the first features, wherein the blocks in the second and third layers are arranged alternately over the first features, and wherein the blocks are the modified second and third features and at least one of following conditions is met: total length of the modified second features is smaller than total length of the second features, and total length of the modified third features is smaller than total length of the third features.

In yet another exemplary aspect, the present disclosure is directed to a method for integrated circuit (IC) manufacturing. The method includes receiving a layout of the IC having a first region interposed between two second regions, the first and second regions oriented lengthwise along a first direction. The layout includes a first layer having first features oriented lengthwise along a second direction perpendicular to the first direction, the first features traversing the first region and the second regions. The layout further includes a second layer having second features in the first region, the second features oriented lengthwise along the first direction. The layout further includes a third layer having third features in the first region, the third features oriented lengthwise along the first direction. The second and third features collectively form cut patterns for the first features. The method further includes modifying the second and third features by a computerized mask house tool for improving mask and wafer manufacturability of the layout, resulting in modified second features and modified third features, wherein the modified second and third features collectively form modified cut patterns for the first features. The modifying of the second and third features meets at least one of following conditions: total spacing between adjacent modified second features is greater than total spacing between adjacent second features, and total spacing between adjacent modified third features is greater than total spacing between adjacent third features. The modifying of the second and third features includes: on condition that one of the first features is overlapped by one of the second features and one of the third features, reducing length of the one of the second features or the one of the third features such that it does not overlap the one of the first features.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for manufacturing an integrated circuit (IC), comprising:
   receiving a layout of the IC having a first region interposed between two second regions, the first and second regions oriented lengthwise along a first direction,
   wherein the layout includes a first layer having first features oriented lengthwise along a second direction perpendicular to the first direction, the first features traversing the first region and extending into both the second regions,
   wherein the layout further includes a second layer having second features in the first region, the second features oriented lengthwise along the first direction,
   wherein the layout further includes a third layer having third features in the first region, the third features oriented lengthwise along the first direction,
   wherein the second and third features collectively form cut patterns for the first features;
   modifying the second and third features by a mask house tool, resulting in modified second features and modified third features, wherein the modified second and third features collectively form modified cut patterns for the first features, wherein the modifying of the second and third features meets at least one of following conditions for improving mask and wafer manufacturability of the layout: (1) total spacing between adjacent modified second features is greater than total spacing between adjacent second features, (2) total length of the modified second features is smaller than total length of the second features, (3) total spacing between adjacent modified third features is greater than total spacing between adjacent third features, and (4) total length of the modified third features is smaller than total length of the third features; and manufacturing the IC using at least one mask fabricated with one of the first, second, and third layers.

2. The method of claim 1, wherein the modifying of the second and third features meets at least one of the conditions (1) and (2), and meets at least one of the conditions (3) and (4).

3. The method of claim 1, wherein the modifying of the second and third features includes:

replacing the second and third features with blocks in the first region on the second and third layers respectively, wherein each of the blocks cuts only one of the first features, wherein the blocks in the second and third layers are arranged alternately over the first features, and wherein the blocks are the modified second and third features.

4. The method of claim 3, wherein the layout further includes via features overlapping the first features in the first region, further comprising:

checking if any of the blocks overlap the via features; and
on condition that one of the blocks overlaps one of the via features, shifting the one of the blocks along the second direction such that it does not overlap the one of the via features while it remains in the first region.

5. The method of claim 1, wherein the layout further includes a fourth layer having fourth features in the first region and oriented lengthwise along the first direction, wherein the second, third, and fourth features collectively form cut patterns for the first features, further comprising:

modifying the fourth features, resulting in modified fourth features, wherein the modified second, third, and fourth features collectively form modified cut patterns for the first features, wherein the modifying of the fourth features and the modifying of the second and third features include:
replacing the second, third, and fourth features with blocks in the first region on the second, third, and fourth layers respectively, wherein each of the blocks cuts only one of the first features, wherein the blocks in the second, third, and fourth layers are arranged alternately over the first features, and wherein the blocks are the modified second, third, and fourth features.

6. The method of claim 5, wherein the layout further includes via features overlapping the first features in the first region, further comprising:

on condition that one of the blocks overlaps one of the via features, shifting the one of the blocks along the second direction such that it does not overlap the one of the via features while it remains in the first region.

7. The method of claim 1, wherein the modifying of the second and third features includes:

on condition that one of the first features is overlapped by one of the second features and one of the third features, reducing length of the one of the second features or the one of the third features such that it does not overlap the one of the first features.

8. The method of claim 1, wherein the first layer further has a fourth feature oriented lengthwise along the second direction, the fourth feature having an end in the first region and extending into one of the two second regions, wherein the modifying of the second and third features includes:

on condition that the end of the fourth feature is overlapped by one of the second features and one of the third features, wherein the one of the second features provides a larger margin of cutting the end of the fourth feature than the one of the third features, reducing length of the one of the third features such that it does not overlap the fourth feature.

9. The method of claim 1, wherein the first layer further has a fourth feature oriented lengthwise along the second direction, the fourth feature having an end in the first region and extending into one of the two second regions, wherein the modifying of the second and third features includes:

on condition that one of the second features overlaps the end of the fourth feature while one of the third features overlaps the fourth feature but does not overlap the end of the fourth feature, reducing length of the one of the third features such that it does not overlap the fourth feature.

10. The method of claim 1, further comprising:
manufacturing a first mask with the first layer;
manufacturing a second mask with the second layer having the modified second features; and
manufacturing a third mask with the third layer having the modified third features.

11. The method of claim 10, further comprising:
performing a first patterning process to a substrate with the first mask, thereby forming one or more features on the substrate;
performing a second patterning process to the substrate with the second mask, thereby removing a first portion of the one or more features; and
performing a third patterning process to the substrate with the third mask, thereby removing a second portion of the one or more features.

12. A method for manufacturing an integrated circuit (IC), comprising:

receiving a layout of the IC having a first region interposed between two second regions, the first and second regions oriented lengthwise along a first direction, wherein the layout includes a first layer having first features oriented lengthwise along a second direction perpendicular to the first direction, the first features traversing the first region and intersecting the second regions, wherein the layout further includes a second layer having second features in the first region, the second features oriented lengthwise along the first direction, wherein the layout further includes a third layer having third features in the first region, the third features oriented lengthwise along the first direction, wherein the second and third features collectively form cut patterns for the first features;

modifying the second and third features by a mask house tool for improving mask and wafer manufacturability of the layout, resulting in modified second features and modified third features, wherein the modified second and third features collectively form modified cut patterns for the first features, wherein the modifying of the second and third features includes:

replacing the second and third features with blocks in the first region on the second and third layers respectively, wherein each of the blocks cuts only one of the first features, wherein the blocks in the second and third layers are arranged alternately over the first features, and wherein the blocks are the modified second and third features and at least one of following conditions is met: total length of the modified second features is smaller than total length of the second features, and total length of the modified third features is smaller than total length of the third features; and manufacturing the IC using at least one mask fabricated with one of the first, second, and third layers.

13. The method of claim 12, wherein the first features are distributed along the first direction with a first pitch, and each of the blocks has a length along the first direction that equals to the first pitch.

14. The method of claim 12, wherein the layout further includes via features overlapping the first features in the first region, further comprising:

checking if any of the blocks overlap the via features; and on condition that one of the blocks overlaps one of the via features, shifting the one of the blocks along the second direction such that it does not overlap the one of the via features while it remains in the first region.

15. The method of claim 14, wherein the via features include a source/drain contact or a gate contact.

16. The method of claim 12, wherein the blocks on the second and third layers are arranged generally along two parallel lines.

17. A method for manufacturing an integrated circuit (IC), comprising:

receiving a layout of the IC having a first region interposed between two second regions, the first and second regions oriented lengthwise along a first direction, wherein the layout includes a first layer having first features oriented lengthwise along a second direction perpendicular to the first direction, the first features traversing the first region and the second regions, wherein the layout further includes a second layer having second features in the first region, the second features oriented lengthwise along the first direction, wherein the layout further includes a third layer having third features in the first region, the third features oriented lengthwise along the first direction, wherein the second and third features collectively form cut patterns for the first features;

modifying the second and third features by a computerized mask house tool for improving mask and wafer manufacturability of the layout, resulting in modified second features and modified third features, wherein the modified second and third features collectively form modified cut patterns for the first features, wherein the modifying of the second and third features meets at least one of following conditions: total spacing between adjacent modified second features is greater than total spacing between adjacent second features, and total spacing between adjacent modified third features is greater than total spacing between adjacent third features wherein the modifying of the second and third features includes:

on condition that one of the first features is overlapped by one of the second features and one of the third features, reducing length of the one of the second features or the one of the third features such that it does not overlap the one of the first features; and manufacturing the IC using at least one mask fabricated with one of the first, second, and third layers.

18. The method of claim 17, wherein the first layer further has a fourth feature oriented lengthwise along the second direction, the fourth feature having an end in the first region and extending into one of the second regions, wherein the modifying of the second and third features includes:

on condition that the end of the fourth feature is overlapped by one of the second features and one of the third features, wherein the one of the second features provides a larger margin of cutting the end of the fourth feature than the one of the third features, reducing length of the one of the third features such that it does not overlap the fourth feature.

19. The method of claim 17, wherein the first layer further has a fourth feature oriented lengthwise along the second direction, the fourth feature having an end in the first region and extending into one of the second regions, wherein the modifying of the second and third features includes:

on condition that one of the second features overlaps the end of the fourth feature while one of the third features overlaps the fourth feature but does not overlap the end of the fourth feature, reducing length of the one of the third features such that it does not overlap the fourth feature.

20. The method of claim 17, wherein the layout further includes via features overlapping the first features in the first region, the second and third features do not overlap the via features, and the modified second and third features do not overlap the via features.

\* \* \* \* \*